United States Patent
Choi et al.

(10) Patent No.: US 10,219,079 B2
(45) Date of Patent: Feb. 26, 2019

(54) DISPLAY DEVICE FOR GENERATING SOUND BY VIBRATING PANEL

(71) Applicant: LG DISPLAY CO., LTD., Seoul (KR)

(72) Inventors: YeongRak Choi, Gyeonggi-do (KR); Sungtae Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/471,184

(22) Filed: Mar. 28, 2017

(65) Prior Publication Data
US 2017/0280217 A1    Sep. 28, 2017

(30) Foreign Application Priority Data

| Mar. 28, 2016 | (KR) | 10-2016-0037118 |
| Apr. 4, 2016 | (KR) | 10-2016-0040885 |
| Apr. 5, 2016 | (KR) | 10-2016-0041384 |
| May 30, 2016 | (KR) | 10-2016-0066455 |
| May 31, 2016 | (KR) | 10-2016-0067431 |
| Jun. 30, 2016 | (KR) | 10-2016-0083122 |
| Nov. 30, 2016 | (KR) | 10-2016-0161789 |
| Nov. 30, 2016 | (KR) | 10-2016-0162189 |
| Dec. 30, 2016 | (KR) | 10-2016-0183867 |

(51) Int. Cl.
*H04R 9/00* (2006.01)
*H04R 9/06* (2006.01)
(Continued)

(52) U.S. Cl.
CPC ............ *H04R 9/066* (2013.01); *H04N 5/642* (2013.01); *H04R 1/025* (2013.01); *H04R 1/028* (2013.01); *H04R 1/26* (2013.01); *H04R 1/288* (2013.01); *H04R 3/14* (2013.01); *H04R 5/02* (2013.01); *H04R 7/045* (2013.01); *H04R 9/025* (2013.01); *H04R 9/06* (2013.01); *H04R 11/02* (2013.01);
(Continued)

(58) Field of Classification Search
CPC ........ H04R 1/028; H04R 1/288; H04R 9/025; H04R 9/06; H04R 2400/03
USPC ..................................................... 381/333
See application file for complete search history.

(56) References Cited

U.S. PATENT DOCUMENTS

| 4,891,842 A | 1/1990 | Green |
| 5,025,474 A | 6/1991 | Tanaka et al. |

(Continued)

FOREIGN PATENT DOCUMENTS

| CN | 1547416 A | 11/2004 |
| CN | 102946577 A | 2/2013 |

(Continued)

OTHER PUBLICATIONS

Communication dated Jun. 30, 2017 from the European Patent Office in related European application No. 16181195.5.

(Continued)

*Primary Examiner* — Disler Paul
(74) *Attorney, Agent, or Firm* — Morgan, Lewis & Bockius LLP

(57) ABSTRACT

A display device includes a display panel; a support structure at a rear of the display panel; a sound generation actuator supported by the support structure and configured to vibrate the display panel to generate sound; and a cap member surrounding the sound generation actuator and secured to the support structure at an area of the support structure, the area being near the sound generation actuator.

17 Claims, 27 Drawing Sheets

(51) Int. Cl.

| | |
|---|---|
| *H04N 5/64* | (2006.01) |
| *H04R 1/02* | (2006.01) |
| *H04R 1/28* | (2006.01) |
| *H04R 11/02* | (2006.01) |
| *H04R 9/02* | (2006.01) |
| *H04R 3/14* | (2006.01) |
| *H04R 1/26* | (2006.01) |
| *H04R 7/04* | (2006.01) |
| *H04R 5/02* | (2006.01) |

(52) U.S. Cl.
CPC ........ *H04R 5/023* (2013.01); *H04R 2307/023* (2013.01); *H04R 2307/025* (2013.01); *H04R 2400/03* (2013.01); *H04R 2440/05* (2013.01); *H04R 2499/15* (2013.01)

(56) References Cited

U.S. PATENT DOCUMENTS

| | | | |
|---|---|---|---|
| 5,796,854 A | 8/1998 | Markow | |
| 6,137,890 A | 10/2000 | Markow | |
| 6,208,237 B1 | 3/2001 | Saiki et al. | |
| 6,238,755 B1 | 5/2001 | Harvey et al. | |
| 6,342,831 B1 | 1/2002 | Azima | |
| 6,443,586 B1 | 9/2002 | Azima et al. | |
| 6,610,237 B2 | 8/2003 | Azima et al. | |
| 6,618,487 B1 | 9/2003 | Azima et al. | |
| 6,677,384 B1 | 1/2004 | Ikemoto et al. | |
| 6,751,329 B2 | 6/2004 | Colloms et al. | |
| 6,795,561 B1 | 9/2004 | Bank | |
| 6,826,285 B2 | 11/2004 | Azima | |
| 6,871,149 B2 | 3/2005 | Sullivan et al. | |
| 6,911,901 B2 | 6/2005 | Bown | |
| 6,922,642 B2 | 7/2005 | Sullivan | |
| 6,937,124 B1 | 8/2005 | Nakamura et al. | |
| 6,985,596 B2 | 1/2006 | Bank et al. | |
| 7,020,302 B2 | 3/2006 | Konishi et al. | |
| 7,050,600 B2 | 5/2006 | Saiki et al. | |
| 7,120,264 B2 | 10/2006 | Saiki et al. | |
| 7,157,649 B2 | 1/2007 | Hill | |
| 7,158,651 B2 | 1/2007 | Bachmann et al. | |
| 7,174,025 B2 | 2/2007 | Azima et al. | |
| 7,184,898 B2 | 2/2007 | Sullivan et al. | |
| 7,215,329 B2 | 5/2007 | Yoshikawa et al. | |
| 7,305,248 B2 | 12/2007 | Mori | |
| 7,372,110 B2 | 5/2008 | Hatano | |
| 7,376,523 B2 | 5/2008 | Sullivan et al. | |
| 7,382,890 B2 | 6/2008 | Saiki et al. | |
| 7,536,211 B2 | 5/2009 | Saiki et al. | |
| 7,545,459 B2 | 6/2009 | Fujiwara et al. | |
| 7,564,984 B2 | 7/2009 | Bank et al. | |
| 7,570,771 B2 | 8/2009 | Whitwell et al. | |
| 7,593,159 B2 | 9/2009 | Yokoyama et al. | |
| 7,657,042 B2 | 2/2010 | Miyata | |
| 7,764,803 B2 | 7/2010 | Kang | |
| 7,769,191 B2 | 8/2010 | Lee et al. | |
| 7,800,702 B2 | 9/2010 | Tsuboi et al. | |
| 7,903,091 B2 | 3/2011 | Lee et al. | |
| 8,174,495 B2 | 5/2012 | Takashima et al. | |
| 8,174,511 B2 | 5/2012 | Takenaka et al. | |
| 8,180,074 B2 | 5/2012 | Ko et al. | |
| 8,194,894 B2 | 6/2012 | Burton et al. | |
| 8,274,480 B2 | 9/2012 | Sullivan | |
| 8,736,558 B2 | 5/2014 | East et al. | |
| 8,830,211 B2 | 9/2014 | Hill | |
| 8,879,766 B1* | 11/2014 | Zhang | H04R 1/028 381/333 |
| 8,917,168 B2 | 12/2014 | Kono et al. | |
| 8,934,228 B2 | 1/2015 | Franklin et al. | |
| 9,001,060 B2 | 4/2015 | Harris | |
| 9,030,447 B2 | 5/2015 | Hsu | |
| 9,035,918 B2 | 5/2015 | Harris et al. | |
| 9,041,662 B2 | 5/2015 | Harris | |
| 9,046,949 B2 | 6/2015 | Adachi et al. | |
| 9,107,006 B2 | 8/2015 | Wang et al. | |
| 9,122,011 B2 | 9/2015 | Oh et al. | |
| 9,137,592 B2 | 9/2015 | Yliaho et al. | |
| 9,148,716 B2 | 9/2015 | Liu et al. | |
| 9,173,014 B2 | 10/2015 | Park | |
| 9,191,749 B2 | 11/2015 | Nabata et al. | |
| 9,197,966 B2 | 11/2015 | Umehara et al. | |
| 9,204,223 B2 | 12/2015 | Nabata et al. | |
| 9,285,882 B2 | 3/2016 | Wang et al. | |
| 9,288,564 B2 | 3/2016 | Faerstain et al. | |
| 9,300,770 B2 | 3/2016 | Nabata et al. | |
| 9,317,063 B2 | 4/2016 | Kwon et al. | |
| 9,332,098 B2 | 5/2016 | Horii | |
| 9,350,832 B2 | 5/2016 | Horii | |
| 9,357,280 B2 | 5/2016 | Mellow et al. | |
| 9,363,591 B2 | 6/2016 | Ozasa et al. | |
| 9,363,607 B2 | 6/2016 | Ando | |
| 9,380,366 B2 | 6/2016 | Kang et al. | |
| 9,389,688 B2 | 7/2016 | Tossavainen et al. | |
| 9,398,358 B2 | 7/2016 | Louh | |
| 9,436,320 B2 | 9/2016 | Kang et al. | |
| 9,544,671 B2* | 1/2017 | Shi | H04R 1/025 |
| 9,609,438 B2* | 3/2017 | Kim | H04R 7/18 |
| 9,654,863 B2* | 5/2017 | Crosby | H04R 1/2811 |
| 2001/0040976 A1 | 11/2001 | Buos | |
| 2001/0043714 A1 | 11/2001 | Asada et al. | |
| 2002/0018574 A1* | 2/2002 | Okuno | H04R 11/02 381/333 |
| 2003/0233794 A1 | 12/2003 | Pylkki et al. | |
| 2005/0129258 A1 | 6/2005 | Fincham | |
| 2005/0129265 A1 | 6/2005 | Nakajima et al. | |
| 2006/0018503 A1* | 1/2006 | Endo | H04R 9/02 381/412 |
| 2006/0078153 A1 | 4/2006 | Sato | |
| 2006/0120542 A1 | 6/2006 | Lee et al. | |
| 2006/0126885 A1 | 6/2006 | Combest | |
| 2006/0140439 A1 | 6/2006 | Nakagawa | |
| 2007/0019134 A1 | 1/2007 | Park et al. | |
| 2007/0036388 A1 | 2/2007 | Lee et al. | |
| 2007/0187172 A1 | 8/2007 | Kaneda et al. | |
| 2007/0290609 A1 | 12/2007 | Ishii et al. | |
| 2009/0034174 A1 | 2/2009 | Ko et al. | |
| 2009/0034759 A1 | 2/2009 | Ko et al. | |
| 2009/0097692 A1 | 4/2009 | Sakamoto | |
| 2009/0247237 A1 | 10/2009 | Mittleman et al. | |
| 2009/0267891 A1 | 10/2009 | Ali | |
| 2011/0248935 A1* | 10/2011 | Mellow | G06F 1/1605 345/173 |
| 2012/0034541 A1 | 2/2012 | Muraoka et al. | |
| 2012/0242592 A1 | 9/2012 | Rothkopf et al. | |
| 2012/0243719 A1 | 9/2012 | Franklin et al. | |
| 2012/0274570 A1 | 11/2012 | Kim | |
| 2013/0089231 A1 | 4/2013 | Wilk et al. | |
| 2013/0106868 A1 | 5/2013 | Shenoy | |
| 2013/0250169 A1 | 9/2013 | Kim | |
| 2014/0029777 A1 | 1/2014 | Jang | |
| 2014/0049522 A1 | 2/2014 | Mathew et al. | |
| 2014/0145836 A1 | 5/2014 | Tossavainen et al. | |
| 2014/0146093 A1 | 5/2014 | Sako et al. | |
| 2014/0197380 A1 | 7/2014 | Sung et al. | |
| 2014/0241564 A1* | 8/2014 | Kang | H04R 7/045 381/386 |
| 2014/0326402 A1 | 11/2014 | Lee et al. | |
| 2014/0334078 A1 | 11/2014 | Lee et al. | |
| 2015/0010187 A1 | 1/2015 | Lee et al. | |
| 2015/0016658 A1 | 1/2015 | Lee | |
| 2015/0062101 A1 | 3/2015 | Kim et al. | |
| 2015/0078604 A1 | 3/2015 | Sec et al. | |
| 2015/0119834 A1 | 4/2015 | Locke et al. | |
| 2015/0138157 A1 | 5/2015 | Harris et al. | |
| 2015/0195630 A1 | 7/2015 | Yliaho et al. | |
| 2015/0341714 A1* | 11/2015 | Ahn | G06F 1/1688 381/333 |
| 2015/0350775 A1 | 12/2015 | Behles et al. | |
| 2016/0011442 A1 | 1/2016 | Lee et al. | |
| 2016/0050472 A1 | 2/2016 | Lee et al. | |
| 2016/0212513 A1 | 7/2016 | Honda et al. | |

(56) References Cited

U.S. PATENT DOCUMENTS

| | | |
|---|---|---|
| 2016/0261966 A1 | 9/2016 | Won |
| 2017/0070811 A1 | 3/2017 | Mihelich et al. |
| 2017/0280216 A1 | 9/2017 | Lee et al. |

FOREIGN PATENT DOCUMENTS

| | | |
|---|---|---|
| CN | 105096778 A | 11/2015 |
| EP | 1 507 438 A2 | 2/2005 |
| EP | 1881731 A1 | 1/2008 |
| EP | 2947857 A2 | 11/2015 |
| JP | 55-25284 A | 2/1980 |
| JP | H02-001987 U | 1/1990 |
| JP | H03-132296 A | 6/1991 |
| JP | 2696801 B2 | 1/1998 |
| JP | H11-44891 A | 2/1999 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |
| JP | 2006-186590 A | 7/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007/528648 A | 10/2007 |
| JP | 2007-300578 A | 11/2007 |
| JP | 2009-100223 A | 5/2009 |
| JP | 2009100223 A | 5/2009 |
| JP | 2009200334 A | 5/2009 |
| JP | 2009/302924 A | 12/2009 |
| JP | 2010-027845 A | 2/2010 |
| JP | 2010-081142 A | 4/2010 |
| JP | 4449605 B2 | 4/2010 |
| JP | 2011-123696 A | 6/2011 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-0063698 A | 7/2008 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005/089014 A1 | 9/2005 |
| WO | 2009/017280 A1 | 2/2009 |
| WO | 2012/129247 A2 | 9/2012 |
| WO | 2015-046288 A1 | 4/2015 |
| WO | 2016/002230 A1 | 1/2016 |

OTHER PUBLICATIONS

Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Office Action dated May 31, 2017, from the Taiwanese Patent Office in related Application No. 106121605.
Office Action dated Mar. 27, 2017, from the Korean Patent Office in related Application No. 10-2016-0146951. Note: KR 10-2015-0133918, JP 2009-100223, and JP 2007-300578 cited therein are already of record.
Japanese Office Action dated Aug. 23, 2018, issued in Japanese Application No. 2017-137757.
Japanese Office Action dated Aug. 23, 2018, issued in Japanese Application No. 2017-124022.
Japanese Office Action dated Sep. 25, 2018, issued in Japanese Application No. 2017-131143.
U.S. Office Action dated Dec. 13, 2018, issued in U.S. Appl. No. 15/785,397.
***Note: U.S. Pat. No. 9,818,805 B2 cited in the Office Action is the issued patent for related U.S. Appl. No. 15/388,939, which was cited in the IDS Transmittal filed Apr. 28, 2017, and is therefore not included here because the record would be cumulative. U.S. Appl. No. 15/785,397 is a continuation of U.S. Appl. No. 15/388,939.
Office Action dated Dec. 11, 2018, issued in Japanese Patent Application No. 2017-131154.
U.S. Office Action dated Dec. 13, 2018, issued in U.S. Appl. No. 15/987,267.

* cited by examiner

DISPLAY DEVICE FOR GENERATING SOUND BY VIBRATING PANEL

This application claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

Technical Field

The present disclosure relates to a display device, and more particularly, to a display device for generating sound by vibrating a display panel.

Description of the Related Art

With the development of various portable electronic devices, such as a mobile communication terminal and a notebook computer, a requirement for a display device applicable thereto is increasing. The display devices include a liquid crystal display device, an electroluminesce display device, a light emitting diode display device, and an organic light emitting diode display device.

Among these display devices, the liquid crystal display (LCD) device typically includes an array substrate including an array of thin film transistors, an upper substrate including a color filter layer and/or a black matrix, etc., and a liquid crystal material layer formed therebetween, wherein an alignment state of the liquid crystal is controlled according to an electric field applied between two electrodes of a pixel area, and thus, the transmittance of light is adjusted to display images.

In a display panel of such a liquid crystal display device, an active area configured to provide an image to a user and a non-active area, which is a peripheral area of the active area, are defined. The display panel is usually manufactured by attaching a first substrate, which is an array substrate having a thin film transistor formed therein to define a pixel area, and a second substrate, which is an upper substrate having a black matrix and/or color filter layer formed thereon, to each other.

The array substrate or first substrate, on which a thin film transistor is formed, includes a plurality of gate lines GS extending in a first direction and a plurality of data lines DL extending in a second direction perpendicular to the first direction, and one pixel area P is defined by each gate line and each data line. One or more thin film transistors are formed in one pixel area P, and gate and source electrodes of each thin film transistor may be connected to a gate line and a data line, respectively.

Among these display devices, the liquid crystal display device does not have its own light-emitting element and thus needs a separate light source. Therefore, the liquid crystal display device has a back-light unit having a light source, such as an LED, which is arranged at the rear surface thereof and irradiates a light toward a front surface of the liquid crystal panel thereof, thereby implementing a recognizable image.

An organic light emitting diode (OLED) display device has advantages of a fast response time, a high light emitting efficiency, a high luminance, low power consumption, and a wide viewing angle, due to using OLEDs, which are self-emitting elements. In the organic light emitting diode display device, sub-pixels including organic light emitting diodes are arranged in a matrix form, and the brightness of sub-pixels selected by a scan signal is controlled according to a gray scale of data.

Meanwhile, a set apparatus or finished product including such a display device as described above may include, for example, a television (TV), a computer monitor, or an advertising panel. Such a display device or set apparatus may include a sound output device, such as a speaker, for generating and outputting sound relating to output images.

It is typical that a company that manufactures a display device, such as a liquid crystal display device or an organic light emitting diode display device, manufactures only the display panel or display device excluding sound functionality, while another company manufactures a speaker and assembles the speaker with the manufactured display device to complete a set apparatus capable of outputting images and sound.

FIG. 1 is a plan view of a speaker included in a related art display device. As shown in FIG. 1, a related art display device 1 includes a speaker 2 disposed at a rear part or a lower part of the display panel. In this structure, sound generated by the speaker 2 does not progress directly towards a viewer, who is viewing an image from the front side of the display device 1, but instead progresses toward the rear part or the lower part of the display panel rather than a front part of the display panel on which the images are being displayed.

Further, when sound generated from the speaker 2 progresses toward the rear part or the lower part of the display panel, the sound quality may be degraded due to an interference with sound reflected by walls, floors, or other surfaces at the rear or below the display panel.

Also, sound generated by a speaker included in the related art display device is not oriented toward a viewer of the display device and may thus undergo diffraction, which degrades the sound localization. Moreover, in configuring a set apparatus, such as a TV, a speaker may occupy an undesirably large amount of space, which imposes a restriction on the design and spatial arrangement of the set apparatus.

Therefore, there has been an increasing requirement for technology which can improve the quality of sound output from a display device and prevent the viewer's immersion from being disturbed.

SUMMARY

Accordingly, embodiments of the present disclosure are directed to a display device for generating sound by vibrating a panel that substantially obviates one or more of the problems due to limitations and disadvantages of the related art.

An aspect of the present disclosure is to provide a display device for generating a sound by directly vibrating a display panel of a the display device.

Another aspect of the present disclosure is to provide a display device in which a sound generation actuator is with a display panel of a display device.

Another aspect of the present disclosure is to provide a display device with improved sound generation efficiency.

Another aspect of the present disclosure is to provide a display device with reduced thickness.

Another aspect of the present disclosure is to provide a display device in which sound leakage is prevented.

Another aspect of the present disclosure is to provide a display device that avoids deterioration and damage from heat generated by a sound generation actuator.

Another aspect of the present disclosure is to provide a display device with enhanced sound output characteristics.

Another aspect of the present disclosure is to provide a display device that reduces internally reflected sound.

Another aspect of the present disclosure is to provide a display device that is easily manufactured with high efficiency.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display device comprises a display panel; a support structure at a rear of the display panel; a sound generation actuator supported by the support structure and configured to vibrate the display panel to generate sound; and a cap member surrounding the sound generation actuator and secured to the support structure at an area of the support structure, the area being near the sound generation actuator.

In another aspect, a display device for generating a sound by vibrating a panel includes a display panel; a cover bottom configured to cover and support at least a rear of the display panel, the cover bottom having a support hole defined therethrough; a sound generation actuator positioned in the support hole with the sound generation actuator contacting the display panel such that the sound generation actuator is configured to vibrate the display panel to generate sound; and a cap member secured to and surrounding an outer peripheral portion of the sound generation actuator.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings:

FIG. 2A is a plan view, and FIG. 2B is a sectional view taken along line I-I' of FIG. 2A.

DETAILED DESCRIPTION

Figure 1:
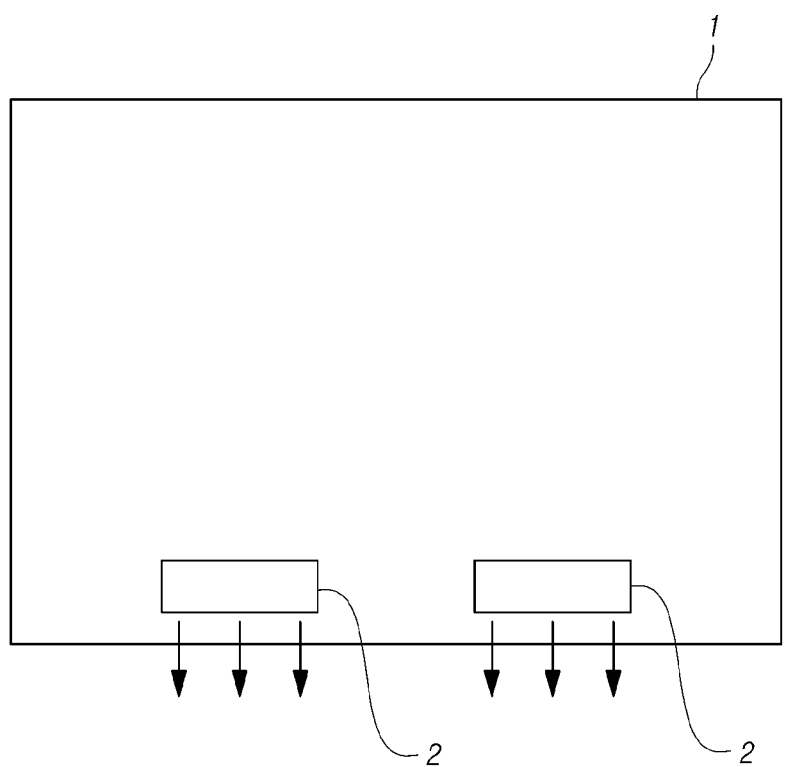
FIG. 1 is a plan view illustrating speakers included in a display device in the related art.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed explanation of certain functions and configurations incorporated herein may have been omitted merely for the sake of brevity.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

The term "display device" used herein includes not only a display device in a narrow sense of the word (such as a liquid crystal module (LCM) or an OLED module) that includes a display panel and a drive unit for driving the display panel, but also an electronic set device or a set device (such as a notebook computer, a television, a computer monitor, equipment display, e.g., display equipment in an automotive display or other type of vehicle display, a mobile electronic device, including a smart phone or an electronic pad, etc.) that includes an LCM, an OLED module, etc. Namely, the display device used herein includes not only a display device in a narrow sense of the word (such as an LCM or an OLED module) but also a set device that is an application product or final consumer device have a display device implemented therein.

However, in some cases, an LCM or an OLED module that includes a display panel and a drive unit thereof may be referred to as "a display device" in a narrow sense of the word, but also includes an electronic device that is a complete product or a finished product including an LCM or an OLED module may be separately referred to as "a set device" or "a set apparatus." For example, a display device in a narrow sense of the word may include an LCD or OLED display panel and a source PCB that is a controller for driving the same, and a set device may further include a set PCB that is a set controller electrically connected to the source PCB to control the entire set device or the entire set apparatus.

Examples of the display panel used in this embodiment may include all forms of display panels, such as a liquid crystal display (LCD) panel, an organic light emitting diode (OLED) display panel, etc., and the display panel is not limited to a particular display panel technology as long as the display panel is capable of generating sound waves or audible outputs due to vibrations created by the sound generation actuator.

In more detail, if the display panel is a liquid crystal display panel, the display panel may include an array substrate that includes a plurality of gate lines and data lines, pixels in the regions where the gate lines cross the data lines, thin film transistors that are switching devices for adjusting light transmittance of the pixels, an upper substrate that includes color filters and/or black matrices, and a liquid crystal layer formed between the array substrate and the upper substrate.

If the display panel is an organic light emitting diode (OLED) display panel, the display panel 100 may include an array substrate that includes a plurality of gate lines and data lines, pixels in regions at or near where the gate lines cross the data lines, and thin film transistors for selectively applying voltages or currents to the respective pixels, an OLED layer on the array substrate; and an encapsulation substrate disposed on the array substrate to cover the OLED layer. The encapsulation substrate protects the thin film transistors and the OLED layer from external impacts and prevents moisture/oxygen from infiltrating into the OLED layer. The layer on the array substrate may include an inorganic light emitting layer(s), for example, quantum dot emitting layer(s).

The display panel used in the display device according the present disclosure has no limitation on the type thereof. Thus, the display panel may be configured using display devices according to a variety display device technologies. Because the display panel used in the display device according to this embodiment has a general structure, a more detailed description of the display panel will be omitted. With any display type, the display panel may further include a backing, such as a metal plate attached thereto. Other structures may also be included.

The display panel having the actuators in the specification may be implemented at a user interface module in a vehicle, such as at the central control panel area in an automobile. For example, such a display panel can be configured between two front seat occupants such that sounds due to vibrations of the display panel propagate toward the interior of the vehicle. As such, the audio experience within a vehicle can be improved when compared to having speakers only at the interior sides in the vehicle.

A technology of generating a sound by directly vibrating a display panel is presented herein. A panel vibration type sound generation device may have a support structure to which a sound generation actuator is secured. For example, the sound generation actuator may be fixedly inserted into a support hole formed through a cover bottom that is a rear support structure for a display device. However, the support structure may include additional parts, may include multiple parts, and need not cover an entire rear of the display device. Further, the sound generation actuator may be directly or indirectly secured to the support structure. In this example, the sound output characteristic may be degraded by sound leakage through the support hole formed through the cover bottom, and the sound quality may be deteriorated by sound interference because a leaked sound is reflected by a rear wall and is output toward the front side of the display device on which a viewer is located. Furthermore, the display panel may be damaged by heat generated from the sound generation actuator as the panel vibrates.

Therefore, one or more embodiments of the present disclosure will be described in detail with reference to the accompanying illustrative drawings.

Figure 2A:
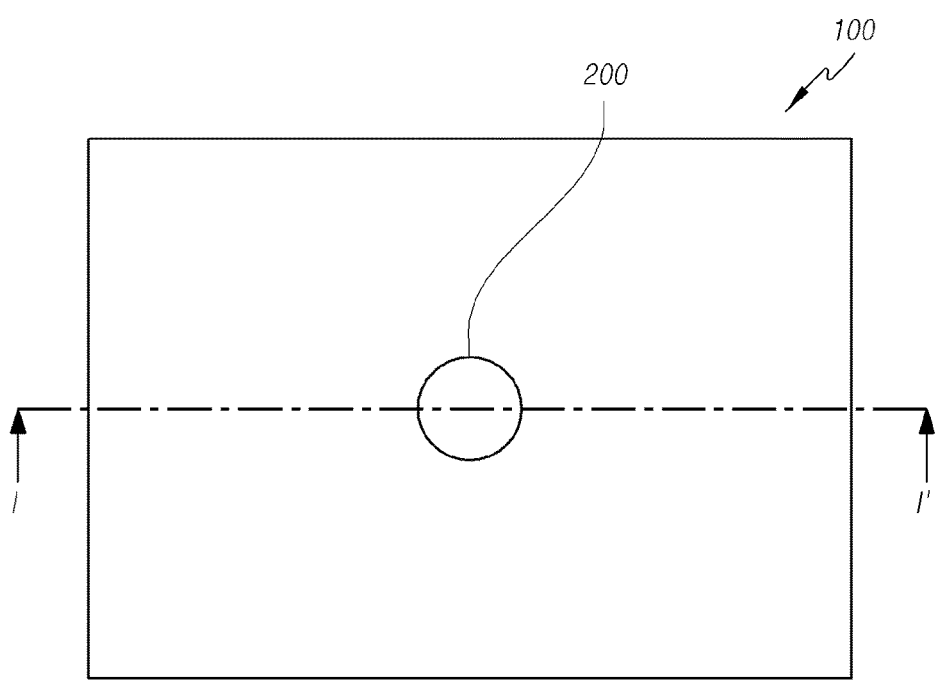
FIGS. 2A and 2B illustrate a display device including a panel vibration type sound generation device according to an embodiment of the disclosure, where
Figure 2B:
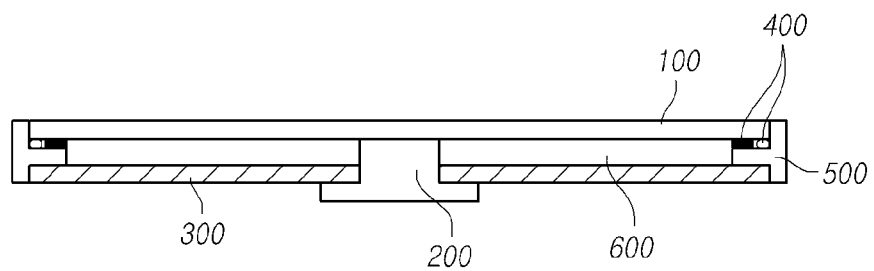

FIGS. 2A and 2B illustrate a display device including a panel vibration type sound generation device according to an embodiment of the present disclosure, where FIG. 2A is a plan view, and FIG. 2B is a sectional view taken along line I-I' of FIG. 2A.

As illustrated in FIGS. 2A and 2B, the display device, to which this example embodiment is applied, includes a display panel 100 for displaying an image and a sound generation actuator 200 brought into contact with one surface of the display panel to vibrate the display panel to generate a sound.

Although it will be described below with reference to FIGS. 4A and 4B, etc., the sound generation actuator 200 may include a magnet, plates supporting the magnet, a center pole protruding from the central region between the plates, and a bobbin disposed to surround the center pole and having a coil wound therearound, a current for generating a sound being applied to the coil, wherein the tip end of the bobbin is disposed to make contact with one surface of the display panel.

As illustrated in FIG. 2B, the display device may include a support structure supporting one or more of the rear surface and the side surface of the display panel, and a lower plate of the sound generation actuator is secured to the support structure. The support structure may include a cover bottom 300 disposed on the rear surface of the display panel 100, and may further include a middle cabinet 500 coupled to the cover bottom 300 while surrounding the side surface of the display panel 100 and configured to receive and support the edge of the display panel 100.

The cover bottom 300 constituting the support structure may be a planar member formed of metal or plastic that extends over the whole rear surface of the display device.

Meanwhile, without being limited to the term, the cover bottom 300 used herein may be referred to as other terms, such as a plate bottom, a back cover, a base frame, a metal frame, a metal chassis, a chassis base, an m-chassis, etc. Further, the support structure should be construed including all forms of frames or planar structures disposed on the rear base part of the display device as a support body supporting the display panel. The support structure may include additional parts, may include multiple parts, and need not cover an entire rear of the display panel. Further, the sound generation actuator may be directly or indirectly secured to the support structure.

The display device, according to this example embodiment, may further include a baffle part 400 disposed between the display panel 100 and the cover bottom 300 or the middle cabinet 500, which is a support structure, to form a space or an air gap 600 that is a space for transmitting generated sound waves. Namely, the air gap 600 may be defined as a completely sealed region by air-tightly coupling the display panel 100 to the cover bottom 300 with the baffle part 400 at the edge of the air gap 600, and the sealed air gap may be referred to as a baffle structure.

The baffle part 400 refers to a member disposed at the edge of the cover bottom 300 or the middle cabinet 500 to air-tightly seal the space between the lower surface of the display panel 100 and the support structure (the cover bottom 300 or the middle cabinet 500) of the display device to define an air gap or a space that enables a sound to be generated according to the vibration of the display panel 100.

Figure 3A:
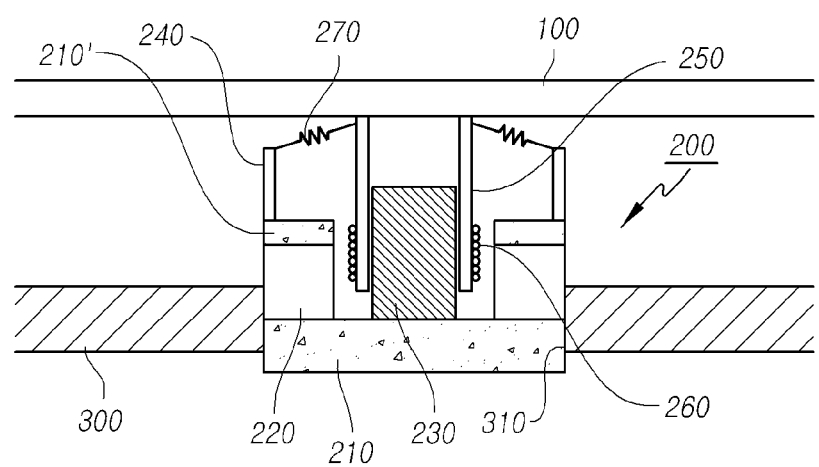
FIGS. 3A and 3B are sectional views of two types of sound generation actuators used according to embodiments.
Figure 3B:
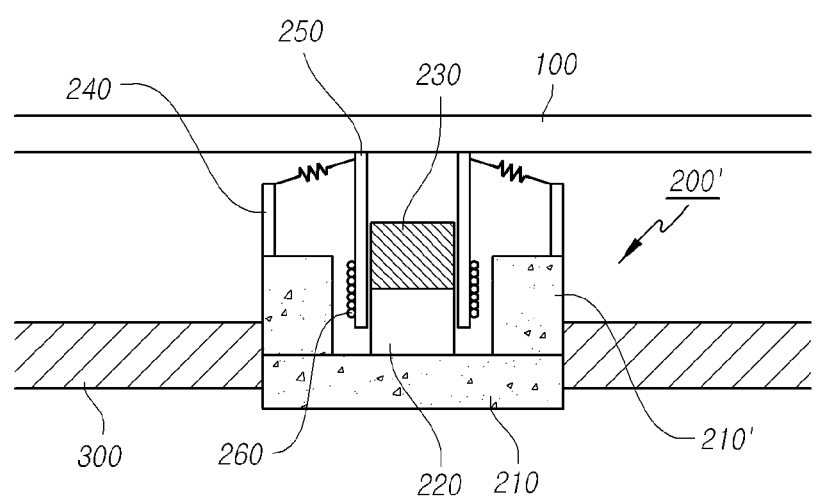

FIGS. 3A and 3B are sectional views of two types of sound generation actuators according to embodiments.

The sound generation actuators 200 used in this embodiment may include magnet 220 as a permanent magnet, plates 210 and 210' supporting the magnet 220, a center pole 230 protruding from the central region of the plate 210, a bobbin 250 disposed to surround the center pole 230, and a coil 260 wound around the bobbin 250 to apply a current for generating a sound.

The sound generation actuators used in this embodiment may include both a sound generation actuator with a first structure in which the magnet is disposed outside the coil and a sound generation actuator with a second structure in which the magnet is disposed inside the coil.

FIG. 3A illustrates a sound generation actuator with a first structure in which the magnet is disposed outside the coil, where the sound generation actuator with the first structure may be referred to as a dynamic type or an external magnet type.

In the sound generation actuator with the first structure, the lower plate 210 is secured to a support hole 310 formed through the cover bottom 300, and the magnet 220, as an annular permanent magnet, is disposed on the outer periphery of the lower plate 210. The upper plate 210' is disposed on the magnet 220, and an outer frame 240 protruding from the upper plate 210' is disposed on the outer periphery of the upper plate 210'. The center pole 230 protrudes from the central region of the lower plate 210, and the bobbin 250 is disposed to surround the center pole 230. The coil 260 is wound around the lower part of the bobbin 250, and a current for generating a sound is applied to the coil 260. A damper 270 may be disposed between the upper part of the bobbin 250 and the outer frame 240.

The lower and upper plates 210 and 210' are configured to secure the sound generation actuator 200 to the cover bottom 300 while supporting the magnet 220. The lower plate 210 has a circular shape as illustrated in FIG. 3A, and the magnet 220 having a ring shape is disposed on the lower plate 210. The upper plate 210' is disposed on the magnet 220.

Because the lower and upper plates 210 and 210' are coupled to the cover bottom 300, the magnet 220 located between the lower and upper plates 210 and 210' may be fixed and supported. The plates 210 and 201' may be formed of a magnetic material, such as iron (Fe). Without being limited to the term, the plates may be referred to as other terms, such as a yoke, etc.

The center pole 230 and the lower plate 210 may be integrally formed with each other.

The bobbin 250 is an annular structure formed of paper, an aluminum sheet, or the like, and the coil 260 is wound around a particular region on the lower part of the bobbin 250. The bobbin 250, together with the coil 360, may be referred to as a voice coil.

When a current is applied to the coil 260, a magnetic field is generated around the coil 260, and on account of an external magnetic field generated by the magnet 220, the whole bobbin moves upward while being guided by the center pole 230 according to Fleming's law. Because the tip end of the bobbin 250 is brought into contact with the rear surface of the display panel 100, the bobbin 250 vibrates the display panel 100 according to whether a current is applied to the coil 260, and sound waves are generated by the vibration.

The magnet 220 may use a sintered magnet, such as barium ferrite, etc., and may be formed of a cast magnet containing an alloy of ferric oxide ($Fe_2O_3$), barium carbonate ($BaCO_3$), strontium ferrite with an improved magnetic component, aluminum (Al), nickel (Ni), and cobalt (Co), but is not limited thereto.

The damper 270 is disposed between the upper part of the bobbin 250 and the outer frame 240 and has a corrugated structure to adjust the vertical vibration of the bobbin 250 while contracting and relaxing according to the vertical motion of the bobbin 250. Namely, the vertical vibration of the bobbin 250 is restricted by the restoring force of the damper 270 because the damper 270 is connected to the bobbin 250 and the outer frame 240. Specifically, the bobbin 250 may return to the original position by means of the restoring force of the damper 270 when the bobbin 250 oscillates to a particular height or more, or to a particular height or less. The damper 270 may be referred to as other terms, such as an edge.

FIG. 3B illustrates the sound generation actuator with the second structure in which the magnet is disposed inside the coil, where the sound generation actuator with the second structure may be referred to as a micro type or an internal magnet type.

In the sound generation actuator with the second structure, the lower plate 210 is secured to the support hole 310 formed through the cover bottom 300, the magnet 220 is disposed on the central region of the lower plate 210, and the center pole 230 is disposed on the magnet 220.

The upper plate 210' protrudes from the outer periphery of the lower plate 210, and an outer frame 240 is disposed on the outer periphery of the upper plate 210'. The bobbin 250 is disposed to surround the magnet 220 and the center pole 230, and the coil 260 is wound around the bobbin 250. A damper 270 is disposed between the outer frame 240 and the bobbin 250.

The sound generation actuator with the second structure can reduce magnetic flux leakage and can be made compact, as compared to the sound generation actuator with the first structure.

While the actuators with the first and second structures may all be used in this embodiment, the actuator with the first structure will be hereinafter representatively described for convenience. The sound generation actuator used in the display device according to this embodiment is not limited to those illustrated in FIGS. 3A and 3B, and any type of actuator capable of vibrating the display panel up and down according to a current applied thereto to generate a sound may be used as the sound generation actuator.

Figure 4A:
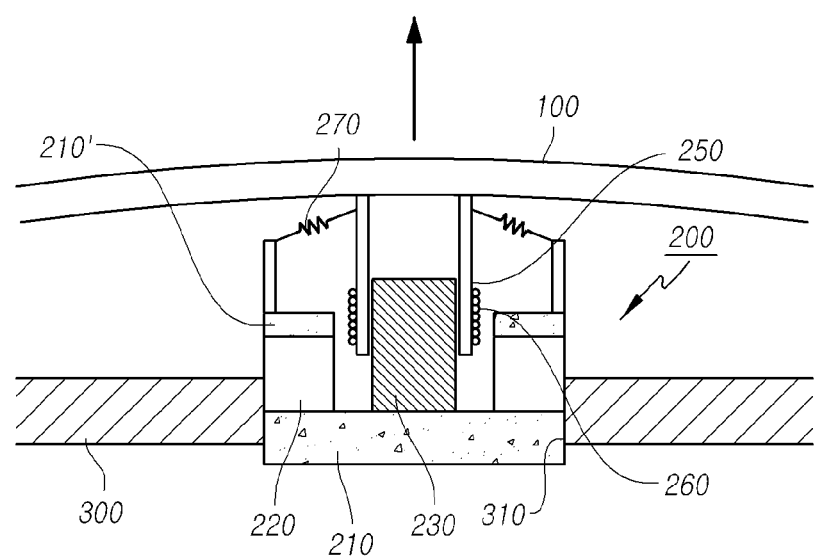
FIGS. 4A and 4B illustrate states in which an example sound generation actuator vibrates the display panel to generate a sound.
Figure 4B:
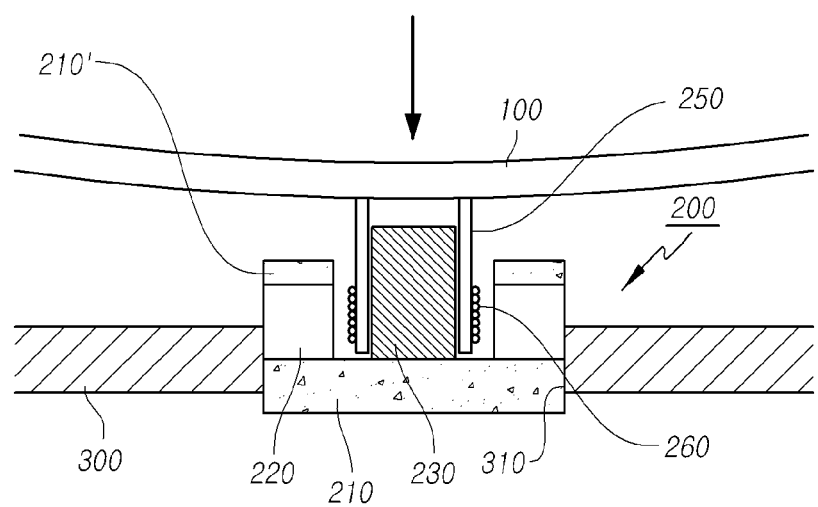

FIGS. 4A and 4B illustrate a state in which the sound generation actuator used in this embodiment vibrates the display panel to generate a sound.

FIG. 4A illustrates a state in which a current has been applied. An external magnetic field is generated between the coils 260 with the center pole 230, which is connected with the lower surface of the magnet 220, as an N pole and the upper plate 210', which is connected with the upper surface of the magnet 220, as an S pole.

If a current for generating a sound is applied to the coil 260 in this state, an applied magnetic field is generated around the coil 260, and a force moving the bobbin 250 upward is generated by the applied magnetic field and the external magnetic field. Accordingly, the bobbin 250 moves upward, and the display panel 100 brought into contact with the tip end of the bobbin 250 vibrates upward (arrow direction), as illustrated in FIG. 4A.

If the application of the current is discontinued, or the current is applied in the opposite direction, a force moving the bobbin 250 downward is generated based on a similar principle, and the display panel 100 vibrates downward accordingly (arrow direction), as illustrated in FIG. 4B.

As described above, the display panel vibrates up and down according to the direction and magnitude of the current applied to the coil, and sound waves are generated by the vibration.

Figure 5A:
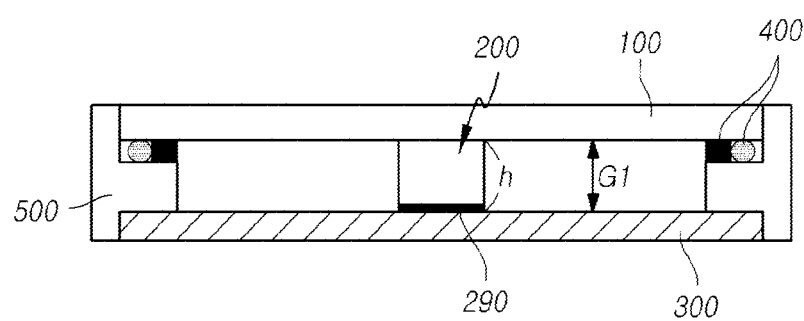
FIGS. 5A and 5B illustrate various structures in which the sound generation actuator is coupled to a cover bottom that is a support structure for the display device.
Figure 5B:
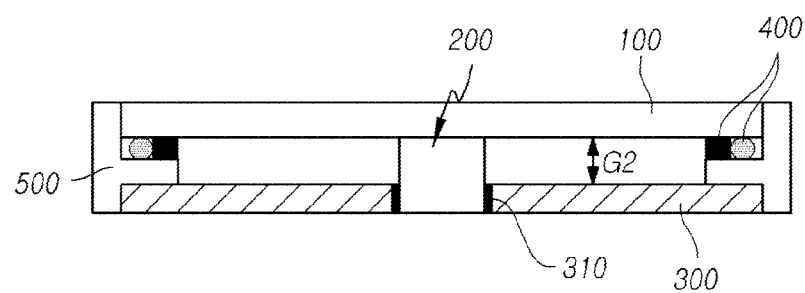

FIGS. 5A and 5B illustrate various structures in which the sound generation actuator is coupled to the cover bottom that is a support structure for the display device.

In the display device to which this example embodiment is applied, the sound generation actuator 200 directly vibrates the display panel to generate a sound.

Accordingly, the main body of the sound generation actuator may be secured to the cover bottom, which is a rear support structure for the display device, because the sound generation actuator has to vibrate the display panel brought into contact with the bobbin (or voice coil) by moving the bobbin (or voice coil).

FIGS. 5A and 5B illustrate various methods of securing the sound generation actuator to the cover bottom, where FIG. 5A illustrates a method of directly attaching the sound generation actuator to the inside of the cover bottom, and FIG. 5B illustrates a method of inserting the sound generation actuator into a support hole formed through the cover bottom to secure the same to the support hole.

In FIG. 5A, the rear surface of the sound generation actuator 200 is bonded and secured to the inside of the cover bottom 300 using an adhesive member 290 without a change in the structure of the cover bottom 300. Meanwhile, in FIG. 5B, the support hole 310 is formed through the cover bottom 300, and a part of the side surface of the sound generation actuator 200 is fixedly inserted into the support hole 310. Of course, in the two cases, the baffle part 400 is disposed between the display panel 100 and the upper surface of the middle cabinet 500 or the cover bottom 300 to form an air gap, which is a sealing region, in the edge region of the display device.

In the example illustrated in FIG. 5A, the air gap between the display panel 100 and the cover bottom 300 has a distance of G1 that is relatively larger than the height h of the sound generation actuator 200, whereas in the example illustrated in FIG. 5B, the air gap between the display panel 100 and the cover bottom 300 has a distance of G2 that is smaller than the height of the sound generation actuator 200 because the part of the sound generation actuator is inserted into the support hole of the cover bottom. Accordingly, the arrangement of FIG. 5B may provide a slim (or thin) display device.

Thus, embodiments of the present disclosure may adopt a support hole formed through the cover bottom, which is a rear support structure for the display device, and inserting the sound generation actuator into the support hole to secure the same to the support hole, as illustrated in FIG. 5B.

Meanwhile, in the method of forming the support hole through the cover bottom of the display device and fixedly inserting the sound generation actuator into the support hole, the support hole has a diameter larger than that of the sound generation actuator so that a sound may leak through the gap between the cover bottom and the sound generation actuator. A description regarding this will be given below with reference to FIGS. 6A to 8.

Figure 6A:
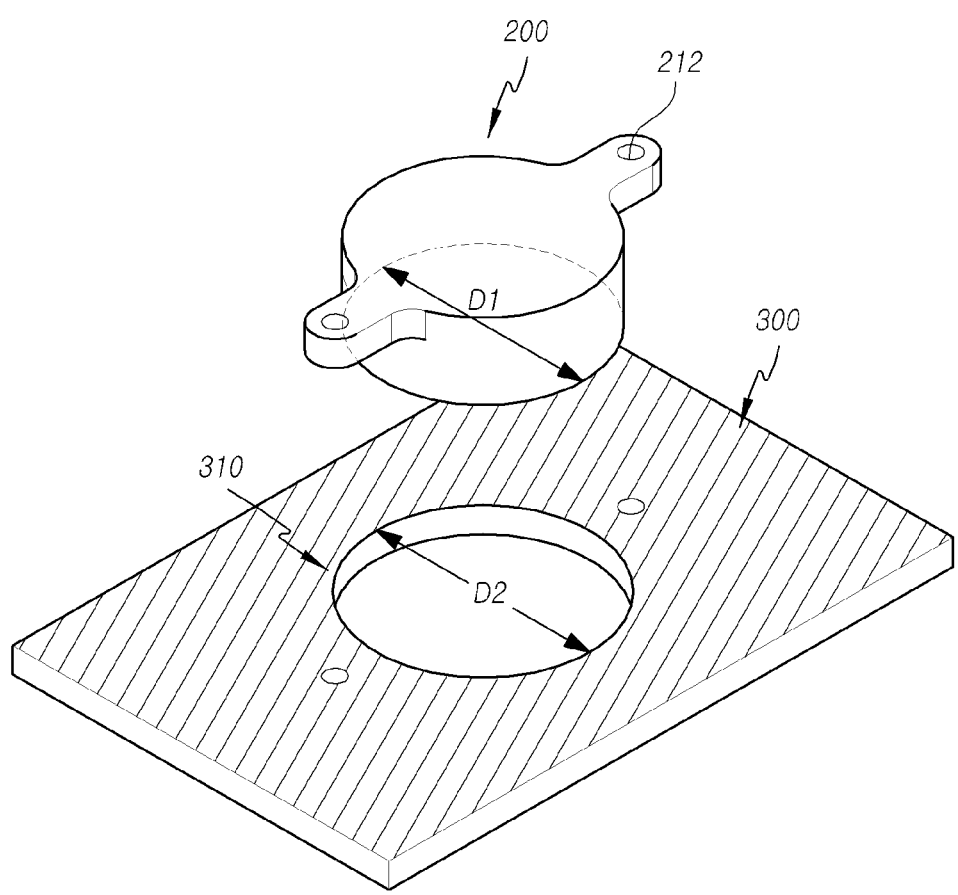
FIG. 6A is a perspective view of the sound generation actuator having extensions to be secured to the cover bottom.
Figure 6B:
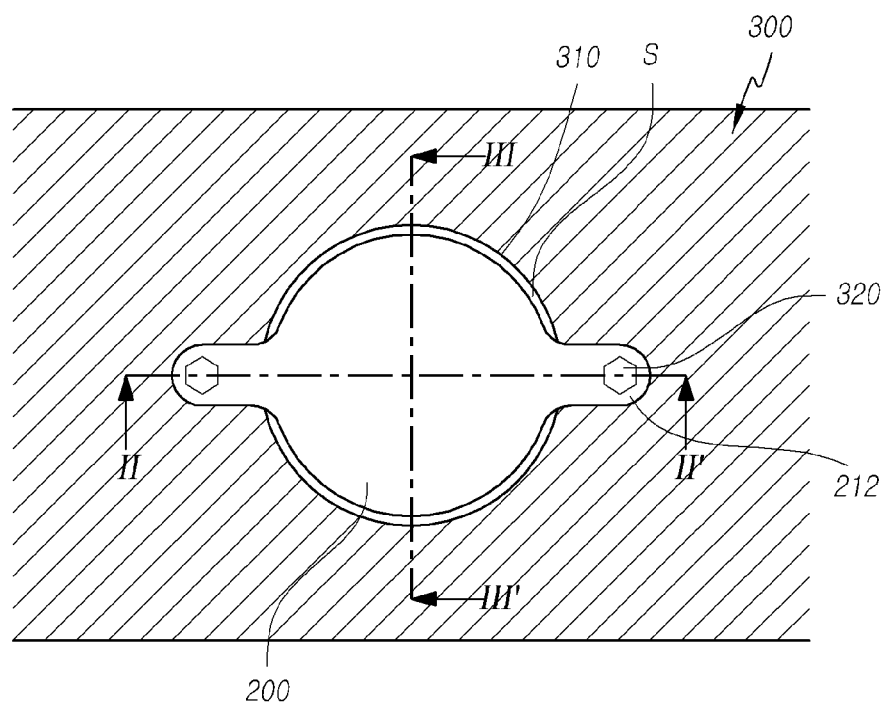
FIG. 6B is a rear view of the sound generation actuator fixedly inserted into a support hole formed through the cover bottom that is a support structure for the display device.
Figure 7A:
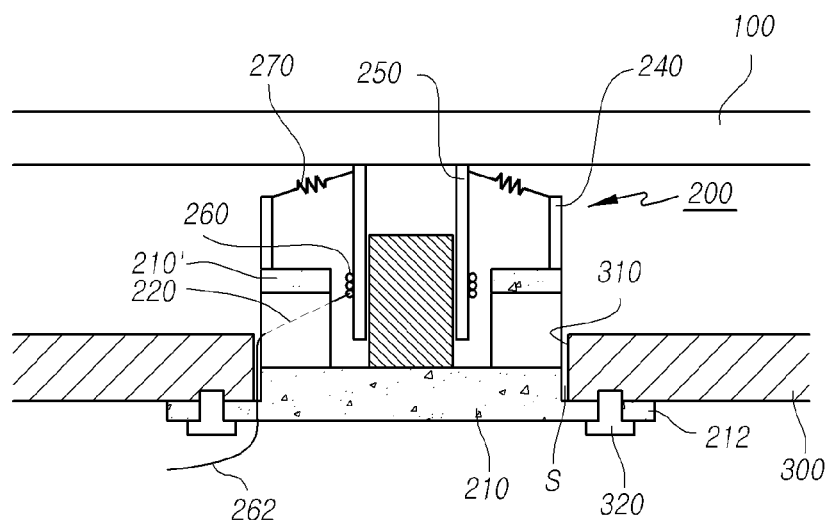
FIGS. 7A and 7B are sectional views taken along lines II-II' and III-III' of FIG. 6B, and FIGS. 7A and 7B illustrate the gap S between the side surface of the sound generation actuator and the support hole of the cover bottom and sound leakage through the gap.
Figure 7B:
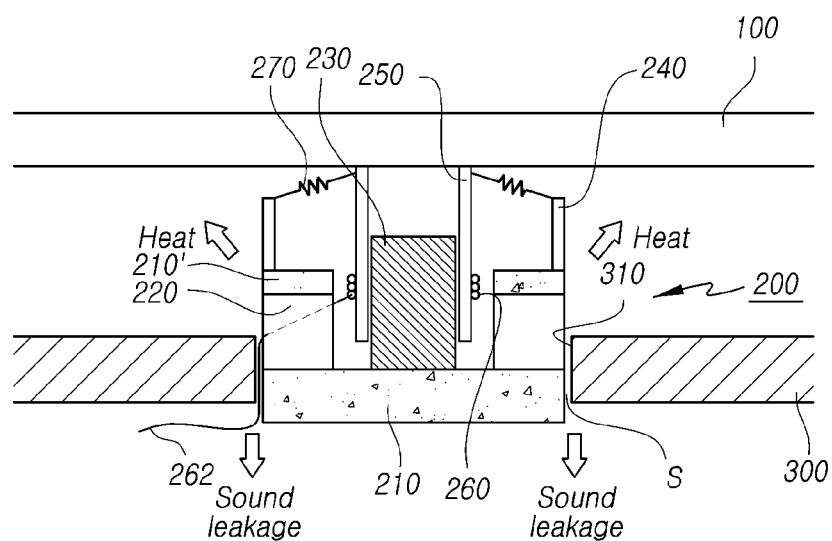

FIG. 6A is a perspective view of the sound generation actuator having extension portions secured to the cover bottom, and FIG. 6B is a rear view of the sound generation actuator fixedly inserted into the support hole formed through the cover bottom that is a support structure for the display device. FIGS. 7A and 7B are sectional views taken along lines II-II' and III-III' of FIG. 6B, where FIGS. 7A and 7B illustrate the gap S between the side surface of the sound generation actuator and the support hole of the cover bottom and sound leakage through the gap.

As illustrated in FIG. 6, the support hole 310 is formed through the cover bottom 300, and one or more of the lower plate 210, the magnet 220, and the upper plate 210' of the sound generation actuator 200 are inserted into the support hole 310 to be received therein. The extension portions 212 extending outward from the lower plate 210 are formed on the lower surface of the lower plate 210 of the sound generation actuator 200 and are secured to the lower surface of the cover bottom 310 to mount the sound generation actuator 200 on the cover bottom 300. Namely, screw holes are formed on the rear surface of the cover bottom 300, and fixing bolts 320 or screws are fastened to the screw holes of the cover bottom 300 through through-holes formed through the extension portions 212 of the lower plate 210 to secure the sound generation actuator 200 to the cover bottom 300, as illustrated in FIG. 6B.

Because the sound generation actuator 200 may be inserted into the support hole 310 of the cover bottom 300, the diameter D2 of the support hole 310 may be greater than the diameter D1 of the sound generation actuator 200, as shown in FIG. 6A. Meanwhile, the sound generation actuator 200 may be strongly vibrate at several ten KHz or more. In this process, the sound generation actuator 200 may collide with the inside of the support hole 310, and unnecessary noise may be generated during the collision.

Furthermore, a space that a connection wire (reference numeral 262 of FIGS. 7A and 7B) enters from the outside may be provided to connect the coil 260 wound around the bobbin 250 of the sound generation actuator 200 to an external sound generation controller.

Accordingly, the diameter D2 of the support hole 310 of the cover bottom 300 may be greater than the diameter D1 of the sound generation actuator 200, and the gap S may exist between the side surface of the sound generation actuator 200 and the support hole 310 of the cover bottom 300 accordingly, as illustrated in FIGS. 6B and 7B. Namely, because the extension portions 210 of the lower plate 200 extend only in the left/right or up/down direction as illustrated in FIG. 7A, the gap S is formed between the sound generation actuator 200 and the support hole 310 of the cover bottom 300 in all directions in which the extension portions are not formed.

As described above, the air gap has to be air-tightly sealed to generate sound by vibrating the display panel and to achieve excellent sound wave transmission. However, the sealing efficiency of the air gap may be weakened by the gap S between the side surface of the sound generation actuator 200 and the support hole 310 of the cover bottom 300.

Namely, a part of the sound generated in the air gap may leak through the gap S between the side surface of the sound generation actuator 200 and the support hole 310 of the cover bottom 300, as illustrated in FIG. 7B. Due to the sound leakage, the sound pressure within the air gap may be reduced, which leads to a decrease in the sound output, and the sound quality may also be degraded by interference between the leaked sound and the reflected sound.

Figure 8:
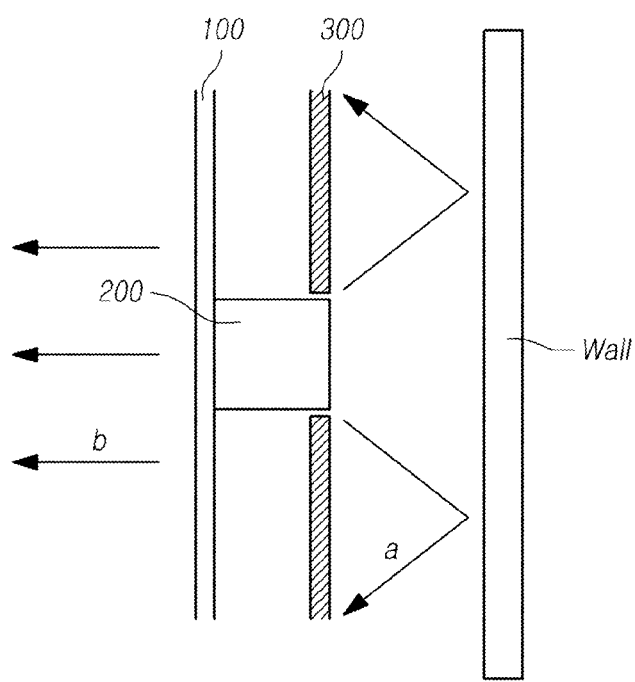
FIG. 8 illustrates a reflected sound induced by the sound leakage of FIG. 7B and a degradation in the sound characteristic caused thereby, the reflected sound being reflected by a rear wall to travel forward.

FIG. 8 illustrates a reflected sound induced by the sound leakage of FIG. 7B and a degradation in the sound characteristic caused thereby due to the reflected sound being reflected by a rear wall to travel forward.

As illustrated in FIG. 8, the sound leaking through the gap S between the side surface of the sound generation actuator 200 and the support hole of the cover bottom 300 is reflected by the rear wall on which the display device (TV, etc.) is mounted, and is directed toward a viewer in front of the display device. This sound may be referred to as reflected sound 'a'. The reflected sound 'a' has a phase different from that of the original normal sound 'b,' or interferes with the normal sound 'b,' thereby degrading the sound output characteristic.

As described above, the sound generation actuator 200 may be inserted into, and secured to, the support hole formed through the cover bottom 300 to reduce the thickness of the display device. However, the sound output characteristic may be degraded by the gap S between the side surface of the sound generation actuator 200 and the support hole of the cover bottom 300.

In addition to concerns of sound leakage, internal components may be damaged by strong heat generated by the sound generation actuator in an operation process because the sound generation actuator is an electronic component strongly vibrating at several tens of KHz or more. For example, when the display panel is an OLED display panel, the display characteristic of the display panel is likely to be degraded when heat generated from the sound generation actuator is transferred to the display panel because the organic light emitting material constituting the display panel is significantly vulnerable to heat. Accordingly, a method for releasing the heat generated by the sound generation actuator to the outside of the display device may be provided.

Figure 9:
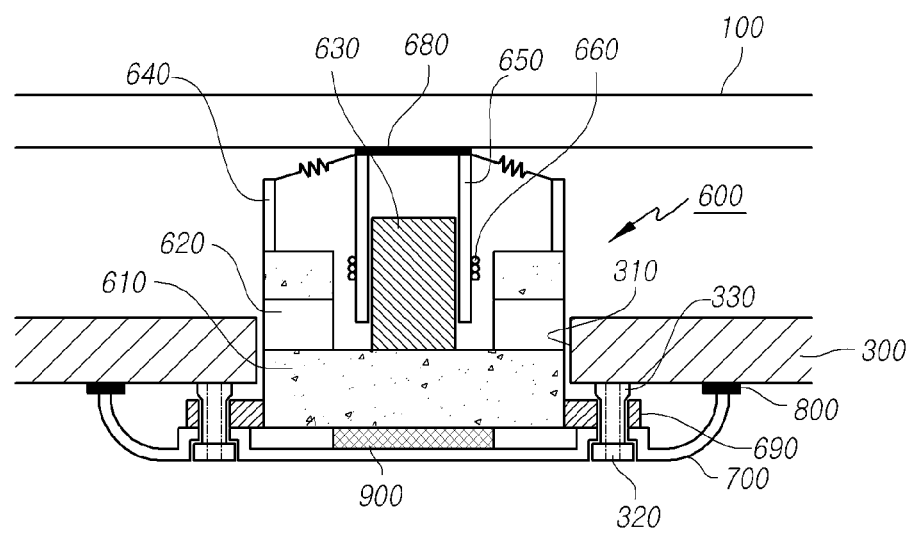
FIG. 9 is a sectional view of a display device that includes a sound generation actuator and a cap member according to an embodiment of the present disclosure.

Embodiments illustrated in the drawings following FIG. 9 propose a structure in which a stationary cap member surrounding the sound generation actuator is further included to make up for the above-described shortcomings.

FIG. 9 is a sectional view of a display device that includes a sound generation actuator and a cap member according to one embodiment of the present disclosure.

The display device, according to an embodiment of the present disclosure, may include a display panel 100 for displaying an image, a cover bottom 300 serving as a support structure for covering and supporting at least the rear surface of the display panel, the sound generation actuator 600 inserted into a support hole 310 formed through the cover bottom 300 and disposed such that the tip end thereof is brought into contact with one surface of the display panel 100, the sound generation actuator 600 vibrating the display panel 100 to generate a sound, and the cap member 700 surrounding and fixing the outer peripheral portion of the sound generation actuator 600.

In the embodiment of FIG. 9, the display device may further include a heat dissipation member 900 disposed to be brought into contact with the inner surface of the cap member 700 and the rear surface of the sound generation actuator 600, for example, the rear surface of a lower plate 610 of the sound generation actuator 600. The heat dissipation member 900 releases heat generated from the sound generation actuator 600 to the outside through the cap member 700 brought into contact with the heat dissipation member 900.

A damping member 800 may be disposed between the edge of the cap member 700 and the rear surface of the cover bottom 300. The damping member 800 may prevent or reduce sound leakage through the gap S between the sound generation actuator 600 and the cover bottom 300 as described above with reference to FIGS. 6A to 7B from travelling to the outside of the cap member 700 and to prevent or reduce noise caused by contact between the cap member 700 formed of metal and the cover bottom 300 when the display panel 100 vibrates.

The heat dissipation member 900 and the damping member 800 will be described below in more detail.

Because the display panel 100, the cover bottom 300, and the support hole 310 formed through the cover bottom 300 in the embodiment of FIG. 9 are the same as those described above with reference to FIGS. 2A to 8, detailed descriptions thereof will be omitted to avoid duplication.

The sound generation actuator 600 may include the lower plate 610 inserted into the support hole 310, a magnet 620 disposed on the lower plate 610, a center pole 630 on the center of the lower plate 610, a bobbin 650 disposed to surround the center pole 630, the tip end of the bobbin 650 being brought into contact with the display panel 100, and a coil 660 wound around the bobbin 650.

The sound generation actuator used in the embodiment of FIG. 9 is not limited to an external magnet type similar to that illustrated in FIG. 9, and an internal or micro type having a magnet disposed in the center thereof as described above may also be used as the sound generation actuator.

While the more detailed configuration and operation principle of the sound generation actuator 600 may correspond to those described with reference to FIGS. 3A to 4B, detailed descriptions thereof will be omitted for brevity.

Meanwhile, in the embodiment of FIG. 9, an outer peripheral part defined as a region expanding beyond the diameter of the lower plate 610 is formed on the rear side of the sound generation actuator 600. The outer peripheral part of the sound generation actuator 600 may be configured to be a diameter expanding part integrally extending from the lower plate 610, or may be configured to be a molded cover 690 that is insert-molded to surround the side surface of the lower plate 610.

FIG. 9 illustrates an example in which the molded cover 690 injection-molded to surround the lateral structure of the actuator, such as the lower plate 610, etc., is used as the outer peripheral part of the sound generation actuator 600.

The molded cover 690 may be formed to surround the side surface of the lower plate 610 (or yoke), which is the rearmost structure of the sound generation actuator 600, and may be manufactured by inserting the lower plate 610 (or yoke) into a mold, inserting plastic or resin into the mold, and then performing injection molding. In this case, the molded cover 690 does not cover the rear surface of the lower plate 610. The reason for this is that heat has to be able to be released through the heat dissipation member 900 disposed between the rear surface of the lower plate 610 (or yoke) made of a heat-conductive material (such as metal, etc.) and the inner surface of the cap member 700 also formed of a heat-conductive material, and to this end, the lower plate (or yoke) and the heat dissipation member 900 have to make contact with each other.

Meanwhile, as will be described below in detail with reference to FIGS. 13A to 14B, one or more vent holes (reference numeral 740 of FIGS. 13A to 14B) for releasing heat may be formed through the cap member in preparation for a case where heat is not sufficiently released by the above-described heat dissipation member, and an annular sealing member (reference numeral 1100 of FIGS. 13A to 14B) may be disposed between the inner surface of the outer peripheral part of the sound generation actuator and the outer surface of the cover bottom to prevent or reduce sound leakage through the vent hole.

Namely, the sound generation actuator may have the outer peripheral part extending beyond the diameter of the lower plate (or yoke) thereof, and the sealing member may be disposed between the outer peripheral part and the cover bottom to prevent or reduce sound leakage.

In the embodiment of FIG. 9, the molded cover 690 may be formed to form the outer peripheral part of the sound generation actuator 600, and the molded cover 690 and the cap member 700 may be fixedly coupled with the cover bottom 300 by a self-clinching nuts 330, such as PEM® nuts or other self-clinching nuts, secured to the cover bottom 300 and the fixing bolts 320.

Self-clinching nut 330 may be secured to the cover bottom 300 by press-fitting one side of the self-clinching nut into a self-clinching nut fixing hole formed on the cover bottom 300 and then coating the tip end portion of the self-clinching nut 330.

Meanwhile, the molded cover 690 of the actuator also has screw through-holes formed therethrough, and the cap member 700 also has screw through-holes formed through the corresponding positions thereof. The sound generation actuator 600 and the cap member 700 are fixedly coupled with the cover bottom 300 by aligning the screw through-holes of the cap member 700 and the cover bottom 300 with the screw holes of the self-clinching nuts 330 and then tightening the fixing bolts 320.

When the self-clinching nuts 330 are used, the lengths of the fixing bolts 320 can be reduced and sufficient fixing force can be achieved despite the small thickness of the cover bottom 300 when the fixing bolts 320 are directly screw-coupled to the cover bottom 300. Namely, when there is no self-clinching nut 300, the fixing bolts 320 having passed through the screw through-holes of the cap member 700 and the molded cover 690, which is the outer peripheral part of the sound generation actuator 600, have to be directly fastened to the screw holes formed on the cover bottom through screw-coupling. In this case, if the cover bottom has a large thickness, there is good coupling, but if the cover bottom has a small thickness, a coupling force may not be sufficient.

Accordingly, when the self-clinching nuts 330 are secured to the cover bottom 300 in advance by press-fitting/caulking and then the outer peripheral part of the actuator 600 and the cap member 700 are screw-coupled to the self-clinching nuts 330, a sufficient coupling force can be achieved even when the cover bottom 300 has a small thickness.

Figure 10A:
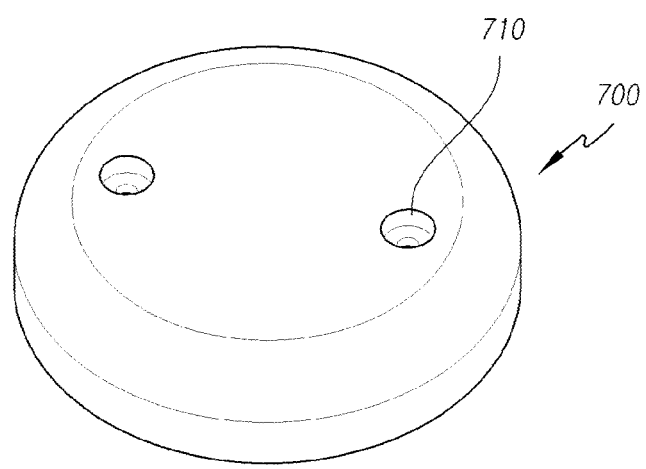
FIGS. 10A and 10B are a perspective view and a sectional view, respectively, of the cap member according to one embodiment of the present disclosure.
Figure 10B:
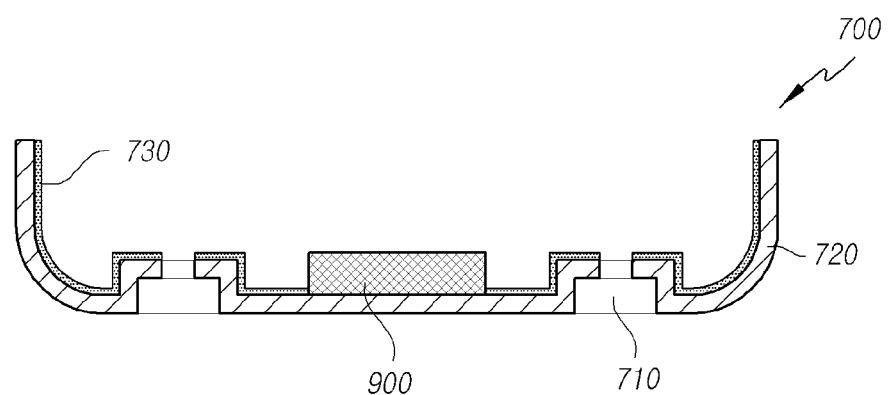

FIGS. 10A and 10B are a perspective view and a sectional view of the cap member according to one embodiment of the present disclosure.

Figure 11A:
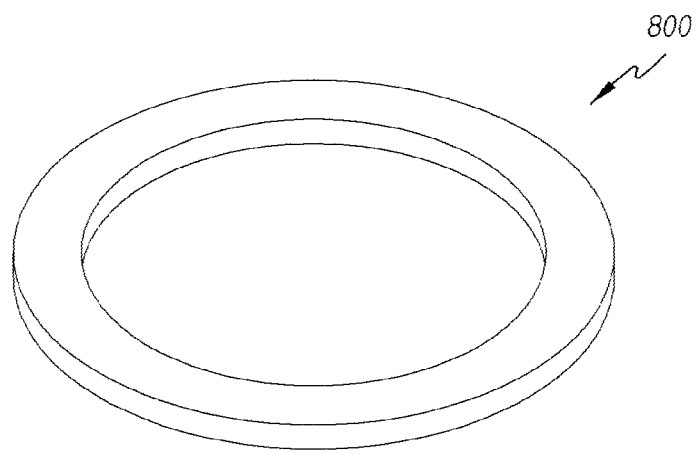
FIG. 11A illustrates an annular damping member, according to one embodiment of the present disclosure, disposed between the edge of the cap member and the rear surface of the cover bottom.
Figure 11B:
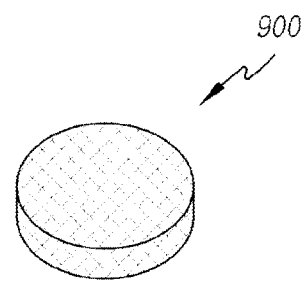
FIG. 11B illustrates a heat dissipation member disposed between the inner surface of the cap member and the rear surface of the sound generation actuator.

FIG. 11A illustrates the annular damping member, according to one embodiment of the present disclosure, disposed between the edge of the cap member and the rear surface of the cover bottom, and FIG. 11B illustrates the heat dissipation member disposed between the inner surface of the cap member and the rear surface of the sound generation actuator.

As illustrated in FIGS. 10A and 10B, the cap member 700 may have a circular cap shape with an empty space inside to surround the whole outer peripheral part of the sound generation actuator 600 and may be formed of a metal material with high thermal conductivity and high thermal heat capacity. Of course, the cap member 700 does not necessarily need to have a circular shape and has no limitation on the shape as long as it can surround the whole outer peripheral part of the sound generation actuator.

The cap member 700 may be formed of aluminum (Al), copper (Cu), or an alloy thereof. However, the cap member 700 is not limited thereto and may be formed of any material with sufficient rigidity and thermal conductivity. In detail, the cap member 700 may be formed of a material having a thermal conductivity of about 60 W/mK or more.

The cap member 700 may be used to prevent or reduce sound leakage to the outside through the gap S between the actuator and the support hole of the cover bottom, which has been described above with reference to FIGS. 6A to 7B, by surrounding the sound generation actuator to air-tightly seal the same.

To this end, the damping member 800 formed of a soft material is disposed between the edge of the cap member and the outer surface of the cover bottom corresponding thereto.

As illustrated in FIG. 11A, the damping member 800 may have an annular disc shape corresponding to the edge of the cap member 700 and may be formed of a material having an elastic modulus of 0.1 Gpa or less, such as, silicone.

The damping member 800 may be manufactured with a foam pad having an adhesive material on one side thereof or a double-sided tape having an adhesive material on both sides thereof. If the damping member 800 is manufactured with a foam pad, the adhesive surface may be bonded to the outer surface of the cover bottom.

The damping member 800 may prevent or reduce noise caused by contact between the edge of the cap member 700 and the outer surface of the cover bottom 300 when the display panel strongly vibrates, and may prevent or reduce sound leakage by air-tightly sealing the space between the edge of the cap member 700 and the outer surface of the cover bottom 300.

Namely, because both the cap member 700 and the cover bottom 300 are formed of hard metal, noise may be generated by discontinuous contact between the edge of the cap member 700 and the outer surface of the cover bottom 300 when the display panel strongly vibrates, and the above-described damping member 800 may prevent or reduce the noise.

The cap member 700 reduces foreign substances that may infiltrate into the sound generation actuator from the outside and functions as a heat sink that releases heat generated by the actuator to the outside through the heat dissipation member 900 in addition to reducing sound leakage.

Namely, the heat dissipation member 900 having a disc shape as illustrated in FIG. 11B is disposed between the rear surface of the sound generation actuator 600 (e.g., the rear surface of the lower plate 610 or yoke in FIG. 9) and the inner surface of the cap member 700 to enable heat generated by the sound generation actuator 600 to be properly released to the outside through the heat dissipation member 900 and the cap member 700.

The heat dissipation member 900 may be formed to be the same or larger in size than the rear surface of the sound generation actuator 600. The heat dissipation member 900 does not necessarily need to have a circular disc shape, as illustrated in FIG. 11B, and may have a rectangular or polygonal disc shape.

Meanwhile, the heat dissipation member 900 has to make strong surface-to-surface contact with the rear surface of the lower plate 610 (or yoke) of the sound generation actuator 600 and the inner surface of the cap member 700 to enhance heat dissipation efficiency.

If the heat dissipation member 900 is formed of simple rigid metal, the lower plate (yoke), the heat dissipation member, and the rear surface of the cap member all have a metal surface. The metal surfaces cannot help but have a particular flatness or less due to the nature of processing. As a result, it is difficult to obtain strong surface contact.

Accordingly, the heat dissipation member 900 according to this embodiment may use a silicon heat-dissipation pad with flexibility, which is obtained by mixing a high heat-conductivity metal material into a silicon base material, to make strong surface-to-surface contact with the rear surface of the lower plate (yoke) of the sound generation actuator and the inner surface of the cap member, thereby enhancing a heat dissipation characteristic.

Meanwhile, the cap member 700 may have a sound-absorbing layer 730 (FIG. 10B) formed in the inner surface of the cap member 700. The sound-absorbing layer 730 functions to appropriately absorb a sound leaking through the gap S between the actuator and the support hole of the cover bottom to prevent or reduce a degradation in the sound output characteristic caused by sound leakage.

The material constituting the sound-absorbing layer 730 may include a porous sound-absorbing material, a planar sound-absorbing material, etc. The porous sound-absorbing material has pores with a small bubble or thin tube shape on the surface and inside. Sound energy may be converted into heat energy by friction generated when air in the pores vibrates as a result of sound waves, and the converted heat energy may be absorbed into the porous sound-absorbing material.

The planar sound-absorbing material has a structure of obtaining a sound absorption effect by consuming sound energy while sound waves are vibrating the plate, and may include a planar material, such as a veneer board, a gypsum board, a fiber board, an asbestos board, etc.

Meanwhile, if the cap member 700 is thin, one or more round portions 720 with a curved surface may be formed on the rear side of the cap member 700 so that the cap member 700 itself does not operate as a vibration plate to generate an unnecessary sound.

If the cap member 700 is formed of a thin metal material having a thickness of 1 mm or less, the cap member 700 itself is likely to function as a passive type vibration plate to additionally generate an undesired sound by means of an air pressure generated in the internal space of the cap member 700 when the sound generation actuator operates. In this case, if the round portions 720 are formed on the rear side of the cap member 700, the vibration of the cap member 700 caused by the air pressure may be restricted to reduce the aforementioned unnecessary sound, than when the cap member 700 has a flat plate shape.

Also, the cap member 700 may have bolt-head receiving recesses 710 formed therein for receiving the heads of the fixing bolts 320. The bolt-head receiving recesses 710 may surround the heads of the fixing bolts for securing the cap member 700 to the outer peripheral part of the actuator 600 and the cover bottom 300. Accordingly, the bolts can be prevented from being loosened, and the entire length of the fixing bolts can be reduced.

Figure 12:
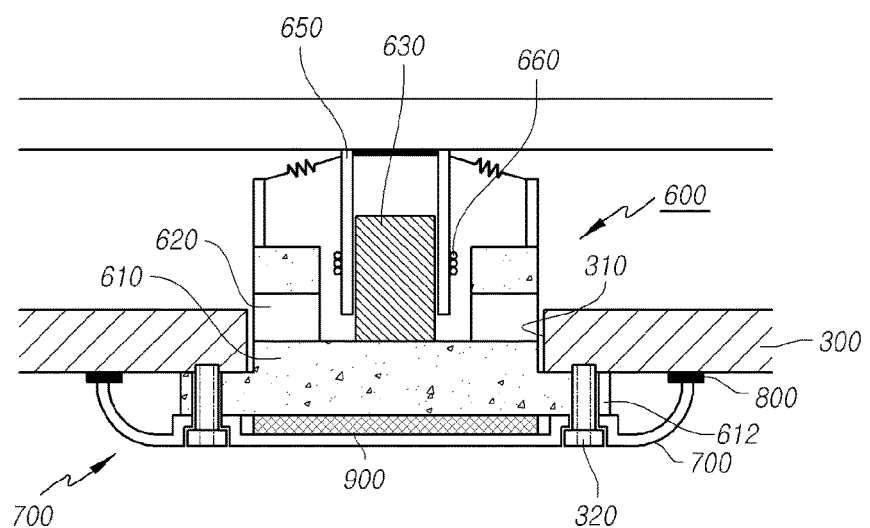
FIG. 12 illustrates a configuration in which a diameter expanding part is provided by expanding the diameter of a lower plate of the sound generation actuator, and the inner surface of the diameter expanding part contacts with the rear surface of the cover bottom.

FIG. 12 illustrates a configuration in which a diameter expanding part is provided by expanding the diameter of the lower plate of the sound generation actuator, and the inner surface of the diameter expanding part makes direct contact with the rear surface of the cover bottom.

In the embodiment of FIG. 12, the molded cover 690 of FIG. 9 is not formed to configure the outer peripheral part of the sound generation actuator 600, and the lower plate 610 (or yoke) of the sound generation actuator 600 expands to the outside to form a diameter expanding part 612, and the diameter expanding part 612 is used as the outer peripheral part of the actuator 600.

In the above-described configuration, the diameter expanding part 612, which is obtained by expanding the lower plate 610 (or yoke) of the sound generation actuator 600 by a particular size in the diameter direction, is disposed to make direct contact with the rear surface of the cover bottom 300 and is directly secured to the cover bottom 300 by the fixing bolts 320 with the cap member 700 covering the lower plate 610.

Namely, unlike in the embodiment of FIG. 9, no self-clinching nut is used in the embodiment of FIG. 12. Because the diameter expanding part 612 makes direct contact with the cover bottom 300 in this case, noise is likely to be generated by vibration, and the length of the fixing bolts 320 becomes longer.

Figure 13A:
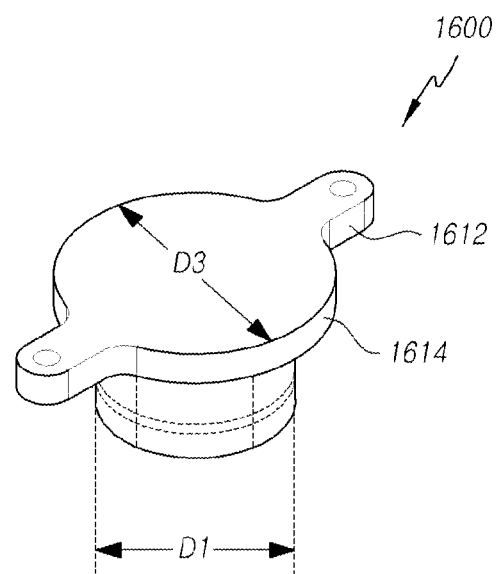
FIGS. 13A and 13B illustrate a configuration in which a sealing member is disposed between the inner surface of a diameter expanding part of a sound generation actuator and the rear surface of a cover bottom and a configuration in which a hole is formed through a cap member to additionally release heat.
Figure 13B:
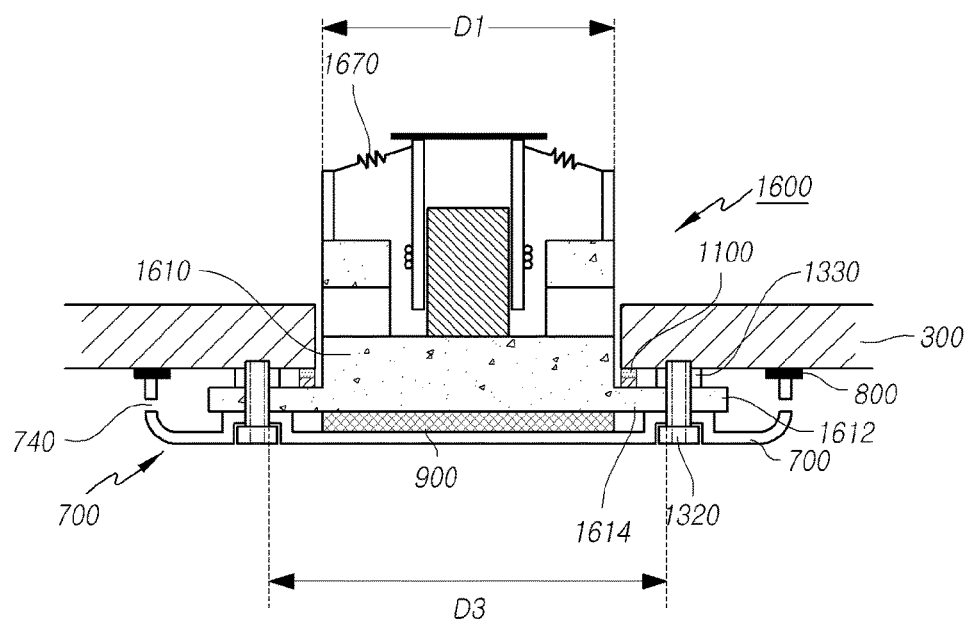

FIGS. 13A and 13B illustrate a configuration in which a sealing member is disposed between the inner surface of a diameter expanding part of a sound generation actuator and the rear surface of a cover bottom to make up for the embodiment of FIG. 12 and a configuration in which a vent hole is formed through a cap member to additionally release heat. The cap member may have one or more vent holes 740 formed on a side thereof in preparation for a case where heat is not sufficiently released by the above-described heat dissipation member 900 as shown in FIG. 13B.

Figure 14A:
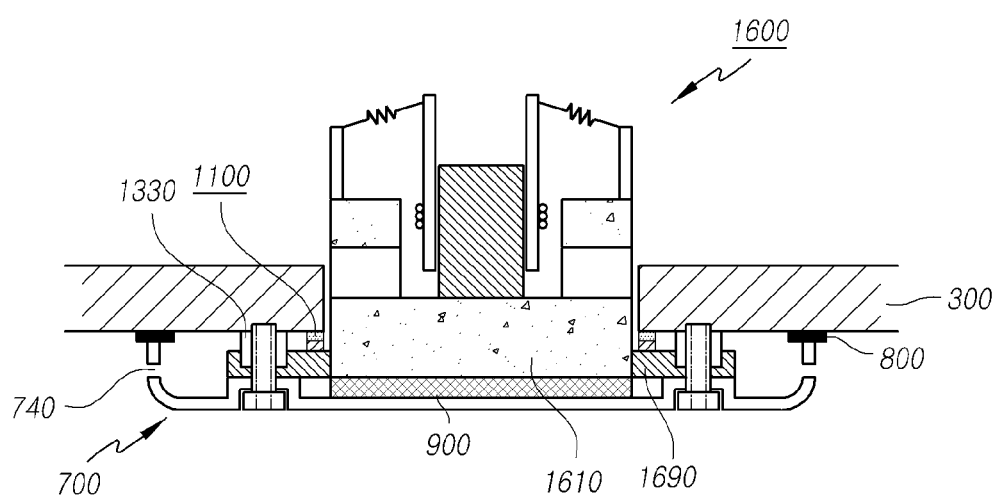
FIG. 14A is a sectional view of a display device that includes an actuator, a molded cover, and a cap member, according to another embodiment of the present disclosure.
Figure 14B:
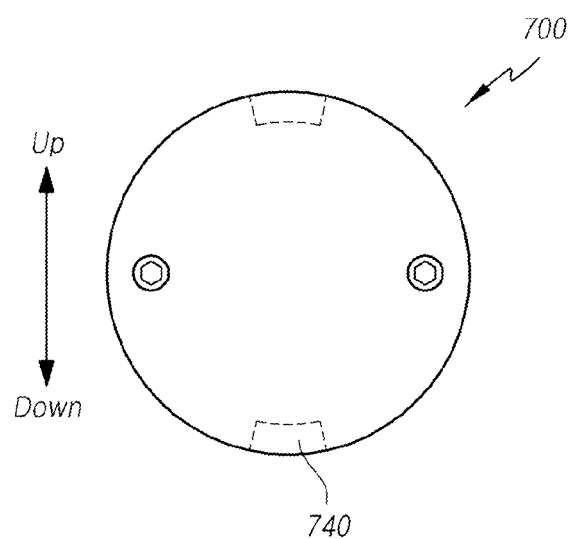
FIG. 14B is a plan view of the cap member, where the cap member has vent holes for releasing heat.

FIG. 14A is a sectional view of a display device that includes an actuator, a molded cover, and a cap member, according to another embodiment of the present disclosure, and FIG. 14B is a plan view of the cap member, where the cap member has vent holes for releasing heat.

Unlike in the embodiment of FIGS. 13A and 13B, the molded cover 1690 for surrounding a lower plate 610 (yoke) of the sound generation actuator 1600 is separately formed in the embodiment of FIGS. 14A and 14B to dispose a sealing member 1100 and to form an outer peripheral part of the actuator 1600 to couple the cap member 700 and the cover bottom 300. For example, the molded cover 1690 formed of plastic is additionally formed on the side surface of the lower plate (yoke) 1610 of the sound generation actuator 1700 by a process, such as insert molding, etc., as in the embodiment of FIG. 9. The molded cover 1690 may have an annular shape surrounding the side surface of the lower plate (yoke) 1610 of the sound generation actuator 1600 and forms the outer peripheral part of the sound generation actuator 1600.

Accordingly, in the embodiment of FIG. 14A, the sound generation actuator 1600, the molded cover 1690 thereof, and the cap member 700 are secured to the cover bottom 300 by fixing bolts using self-clinching nuts 1330 secured to the cover bottom 300, as in the embodiment of FIG. 9.

A heat dissipation member 900 may be disposed between the inner surface of the cap member 700 and the rear surface of the sound generation actuator 1600, as in the example embodiment of FIGS. 13A and 13B, and vent holes 740 are formed through a part of the cap member 700 to additionally release heat.

The annular sealing member 1100 may be disposed between the inner surface of the molded cover 1690 forming the outer peripheral part of the sound generation actuator 1600 and the rear surface of the cover bottom 300. The sealing member 1100 may be formed of dual sealing parts having different elastic modulus, as described below.

When the molded cover 1690 forms the outer peripheral part of the sound generation actuator 1600 as illustrated in FIG. 14A, the cap member and the sealing member 1100 can be mounted without having to change the basic structure of the sound generation actuator 1600 including the lower plate (yoke) 1610. Namely, as illustrated in FIGS. 13B and 14A, the vent holes 740 for releasing heat staying in the cap member 700 to the outside may be formed through some regions of the cap member 700 in this embodiment to additionally release heat.

At least two or more vent holes 740 may be symmetrically formed in particular positions of the outer peripheral portion (the side) of the cap member 700. Considering the characteristic of thermal radiation directed upward, the vent holes 740 may be formed in upper and lower positions of the cap member 700 with respect to the direction in which the display device is disposed.

Namely, when the direction toward the ground is defined as a downward direction and the opposite direction is defined as an upward direction with the display device, according to this embodiment, being normally disposed, one vent hole 740 may be formed in an upper position and in a lower position of the cap member, as illustrated in FIG. 14B. Because heat is usually transferred upward, the vent hole 740 may be formed in the upper position of the cap member to additionally enhance the heat dissipation characteristic.

As described above, according to this embodiment, it is possible to avoid degradation of the sound generation actuator due to heat, in addition to preventing thermal damage to an organic light emitting device, by releasing heat generated by the sound generation actuator to the outside through the vent holes additionally formed through the heat dissipation member and the cap member.

In a case where this embodiment is not applied, when the sound generation actuator operates, the temperature of the lower plate (or yoke) rises to about 77 degrees C., and the temperature of the magnet rises to about 80 degrees C. that is the maximum service temperature of a neodymium (Nd) magnet. Due to this, the magnetic force of the magnet is reduced. Of course, a magnet with excellent heat resistance may be used, but the magnetic body has a limitation in use because it is relatively expensive.

In contrast, if a heat dissipation unit, such as the heat dissipation member according to this embodiment, is used, experimental results show that the temperature of the cap member is maintained at 45 degrees C. or less, and the temperature of the lower plate (yoke) of the sound generation actuator is maintained to be lower than that of the cap member.

Therefore, according to this example embodiment, the thermally-induced reduction in the magnetic force of the magnet constituting the sound generation actuator can be lessened.

Meanwhile, if the vent holes 740 are formed through the cap member 700 as illustrated in FIGS. 13B and 14A, the internal space of the cap member may not be air-tightly sealed, and thus, sound may leak through the vent holes.

Furthermore, when the outer peripheral part of the sound generation actuator and the cap member are fixedly coupled to the cover bottom using the fixing bolts without using self-clinching nuts as in FIGS. 9 and 12, the fixing bolts may be loosened, and thus the coupling portions of components may be brought into contact with one another by a strong vibration of the actuator to generate undesired noise.

Accordingly, to solve the sound leakage caused by the vent holes or the noise caused by the inaccuracy of the screw-coupling between the actuator and the cover bottom, the sealing member 1100 may be additionally disposed between the inner surface of the outer peripheral part of the sound generation actuator 1600 and the rear surface of the cover bottom 300 in the embodiments of FIGS. 13A to 14B.

To dispose the sealing member 1100, the sound generation actuator may have the outer peripheral part having a diameter larger than that of the support hole of the cover bottom 300. Two methods for forming the outer peripheral part of the sound generation actuator may be considered.

FIGS. 13A and 13B illustrate one of the two methods. Among components of the sound generation actuator, the lower plate 1610 (or yoke) includes a diameter expanding part 1614 integrally extending from the lower plate 1610, and the sealing member 1100 is disposed between the diameter expanding part 1614 and the rear surface of the cover bottom 300.

Namely, the lower plate 1610 of the sound generation actuator 1600 does not have a general cylindrical shape, but has an annular protrusion formed on one side thereof and having a larger diameter than the remaining portion. The annular protrusion having a larger diameter is defined as the diameter expanding part 1614. When the sound generation actuator 1600 has a basic diameter of D1, the diameter expanding part 1614 has a diameter of D3 larger than D1 as illustrated in FIG. 13A, and an extension portions 1612 for screw-coupling of the cap member 700 and the actuator 1600 extends from the diameter expanding part 1614 in a part of the diameter expanding part 1614.

FIG. 13B is a sectional view illustrating the sound generation actuator 1600 and the cap member 700 that are secured to the cover bottom 300. The sound generation actuator 1600 having the structure illustrated in FIG. 13A and the cap member 700 similar to that illustrated in FIG. 10 are secured to the cover bottom 300 by fixing bolts 1320 using self-clinching nuts 1330 secured to the cover bottom as in FIG. 9.

Meanwhile, the heat dissipation member 900 is disposed between the inner surface of the cap member 700 and the rear surface of the sound generation actuator 1600, and the vent holes 740 are formed through a part of the cap member 700 to additionally release heat.

The sealing member 1100 having an annular shape is disposed between the inner surface of the diameter expanding part 1614 forming the outer peripheral part of the sound generation actuator 1600 and the rear surface of the cover bottom 300. The sealing member 1100 may be a kind of sealing member having an annular O-ring shape. One side of the sealing member 1100 is brought into contact with, or attached to, the inner surface of the outer peripheral part of the sound generation actuator 1600, and the other side is brought into contact with the outer surface of the cover bottom 300. Accordingly, leakage that may be caused by the vent holes 740 of the cap member 700 can be reduced, thereby reducing noise caused by the inaccuracy of the screw-coupling between the actuator 1600 and the cover bottom 300.

Namely, when the cap member 700 has the vent holes 740, a sound leaking through the gap S between the sound generation actuator and the support hole of the cover bottom, as described above with reference to FIGS. 6A to 8, may leak through the vent holes 740. However, when the sealing member 1100 is disposed as illustrated in FIGS. 13A and 13B, the sound leaking through the gap S between the sound generation actuator and the support hole of the cover bottom are blocked by the sealing member 1100, thereby reducing sound leakage from the cap member 700.

Figure 15A:
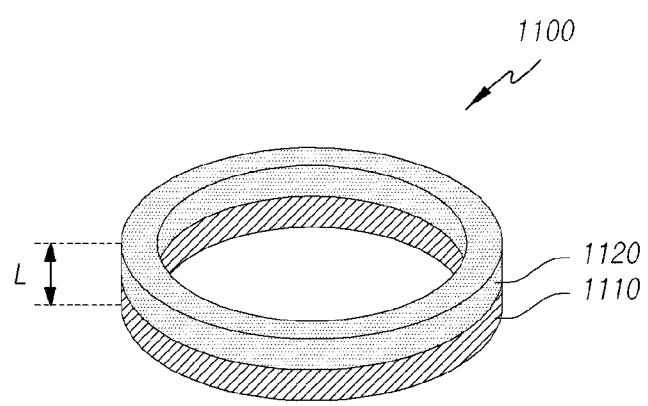
FIGS. 15A and 15B illustrate a configuration of the sealing member used in an embodiment of the present disclosure.
Figure 15B:
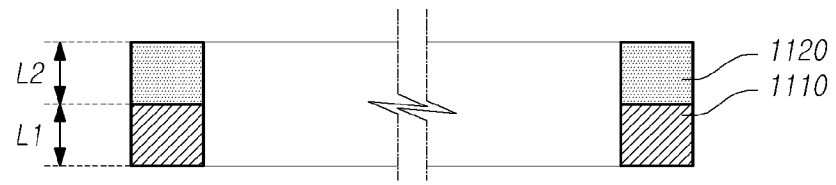

To achieve this, the material of the sealing member 1100 may be provided as follows. In a case where the sealing member 1100 is formed of a soft material with a low elastic modulus, the sealing member 1100 may be deformed by the pressure of the sound leaking through the gap S between the sound generation actuator and the support hole of the cover bottom, and thus a part of the sound may leak. In contrast, if the sealing member 1100 is formed of a hard material with a high elastic modulus, deformation caused by the sound pressure and the sound leakage according to the deformation can be reduced. However, when the sound generation actuator vibrates to generate a sound, undesired noise may be generated by intermittent contact between the tip end of the sealing member 1100 and the rear surface of the cover bottom 300. Accordingly, the sealing member 1100 according to the present disclosure may be configured to include first and second sealing parts 1110 and 1120 formed of two different materials, as illustrated in FIGS. 15A and 15B. FIGS. 15A and 15B illustrate a configuration of the sealing member used in an example embodiment of the present disclosure.

As illustrated in FIGS. 15A and 15B, the sealing member 1100 is an annular member having a particular height of L. The height L of the sealing member is substantially the same as the distance between the inner surface of the outer peripheral part of the sound generation actuator 1600 and the rear surface of the cover bottom 300.

As illustrated in FIGS. 15A and 15B, the sealing member 1100 may include the first sealing part 1110 brought into contact with the inner surface of the outer peripheral part of the sound generation actuator and having a first elastic modulus and the second sealing part 1120 extending from the first sealing member and having a second elastic modulus lower than the first elastic modulus.

The first sealing part 1110 is brought into contact with, or bonded to, the inner surface of the outer peripheral part of the sound generation actuator, and the second sealing part 1120 is disposed to be brought into contact with the inner surface of the cover bottom. The first sealing part 1110 has the first elastic modulus of about 2 Mpa or more and is formed of a relatively hard material, such as metal or plastic. In contrast, the second sealing part 1120 has the second elastic modulus of about 0.5 Mpa or less and is formed of a soft material, such as silicon, rubber or non-woven fabric.

By forming the sealing member with the two materials having the different elastic modulus as described above, it is possible to solve the aforementioned problems that may be generated when the sealing member is formed of a single material, that is, noise may be generated when the sealing member is formed of a hard material and sound leakage may occur due to deformation when the sealing member is formed of a soft material.

Namely, when the sealing member having the double structure is used, deformation caused by a sound pressure can be prevented because the first sealing part 1100 brought into contact with the outer peripheral part of the sound generation actuator is basically formed of a hard material, and noise can be reduced because the second sealing part 1120 formed of a soft material that is disposed to make contact with the rear surface of the cover bottom operates as a damper that absorbs an impact according to contact with the rear surface of the cover bottom that is generated when vibration is induced.

The heights of the first and second sealing parts 1110 and 1120 may be selected to improve this effect. A description regarding this will be described below.

The height L2 of the second sealing part 1120 formed of a soft material may be determined according to the material of the second sealing part, but may be adjusted to about 3 mm or less. Namely, the height L2 of the second sealing part 1120 may be adjusted to a particular value according to the material as long as it can reduce noise caused by contact with the cover bottom.

The height L1 of the first sealing part 1110 formed of a hard material may be variably set according to the total height L of the sealing member and is determined to be a value obtained by subtracting the height L2 of the second sealing part 1120, which has been determined to be a particular value, from the total height L of the sealing member.

For example, in a case where the distance between the inner surface of the outer peripheral part of the sound generation actuator and the rear surface of the cover bottom is 10 mm, the total height L of the sealing member 1100 is about 10 mm, and the height L1 of the first sealing part 1110 may be determined to be 9 mm if the height L2 of the second sealing part 1120 made of non-woven fabric is 1 mm and may be determined to be about 8 mm if the height L2 of the second sealing part 1120 made of silicon is 2 mm.

By disposing the sealing member between the outer peripheral part of the sound generation actuator and the rear surface of the cover bottom as described above, sound leakage through the gap S between the sound generation actuator and the support hole of the cover bottom can be prevented.

Further, by forming the sealing member with dual sealing parts having different elastic modulus and optimizing the materials (elastic modulus) and heights of the dual sealing parts, noise caused by contact between the sealing member and the cover bottom can be prevented while preventing sound leakage.

When the diameter expanding part is formed by directly expanding the lower plate (yoke) of the actuator as illustrated in FIGS. 13A and 13B to form the outer peripheral part of the sound generation actuator for the arrangement of the sealing member 1100, the rigidity of the sound generation actuator, as compared with when a separate molded cover structure is used, can be prevented.

Figure 16:
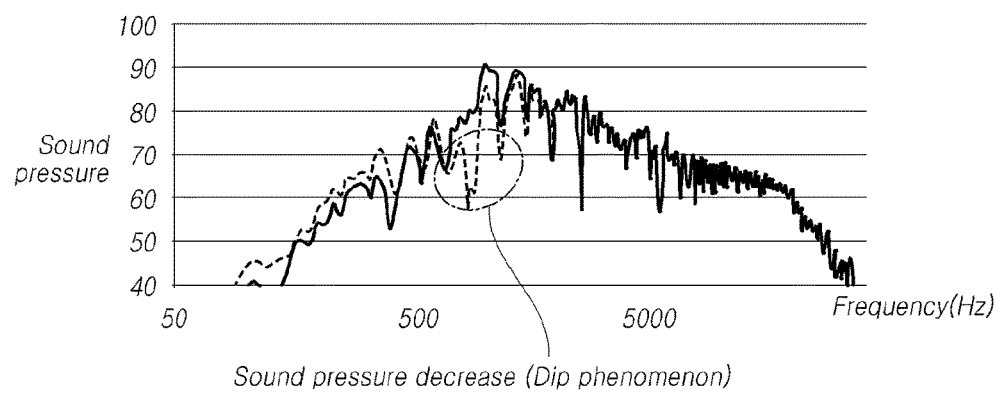
FIG. 16 is a graph depicting the sound output characteristic when the sealing member and the cap structure according to embodiments of the present disclosure were used.

FIG. 16 is a graph depicting the sound output characteristic when the sealing member and the cap structure according to the embodiments of the present disclosure were used.

In FIG. 16, the dotted line represents a sound output according to frequency when the cap member and the sealing member according to the present disclosure were not used, and the solid line represents a sound output according to frequency when the cap member and the sealing member according to the present disclosure were used.

As shown by the dotted line of FIG. 16, when the cap member and the sealing member according to the present disclosure were not used, the Dip phenomenon occurred in which the sound output (sound pressure, dB) was rapidly decreased in the specific frequency band (about 500 Hz to about 1000 Hz) by the sound leakage through the gap S between the sound generation actuator and the support hole of the cover bottom and the reflected sound thereof.

In contrast, as shown by the solid line of FIG. 16, when the cap member and the sealing member according to the present disclosure were used, the sound pressure decrease (the dip phenomenon) in the specific frequency band was prevented, and thus more uniform sound quality was achieved in the entire frequency band.

As described above, according to this embodiment, in the configuration of the display device including the panel vibration type sound generation device, the sound generation actuator is fixedly inserted into the support hole formed through the support structure of the display device, and the cap member secured to surround the outer peripheral part of the sound generation actuator is further included, thereby preventing sound leakage through the support hole and a reflected sound and preventing the infiltration of foreign substances.

Moreover, the heat dissipation member made of a heat conductive material may be disposed between the inner surface of the cap member and the outer peripheral part of the actuator, so that heat generated by the sound generation actuator is released to the outside, thereby preventing damage to the display panel caused by heat.

Further, the through-holes for releasing heat are formed through a part of the cap member, and the sealing member for preventing a reflected sound is disposed between the inner surface of the outer peripheral part of the sound generation actuator and the outer surface of the cover bottom, thereby improving the efficiency to release heat generated by the sound generation actuator and preventing sound leakage through the support hole.

In detail, by forming the sealing member using the dual sealing parts having different elastic modulus and by selecting the materials (elastic modulus) and heights of the dual sealing parts, noise caused by contact between the sealing member and the cover bottom can be prevented while also preventing sound leakage.

According to one or more example embodiments of the present disclosure, a display device includes a display panel, a support structure at a rear of the display panel, a sound generation actuator supported by the support structure and configured to vibrate the display panel to generate sound, and a cap member surrounding the sound generation actuator and secured to the support structure at an area of the support structure, the area being near the sound generation actuator.

According to one or more example embodiments of the present disclosure, the sound generation actuator may be positioned through the support structure such that an end of the sound generation actuator contacts the display panel.

According to one or more example embodiments of the present disclosure, the display device may further include a heat dissipation member in contact with an inner surface of the cap member and a rear of the sound generation actuator.

According to one or more example embodiments of the present disclosure, the display device may further include a damping member between an edge of the cap member and a rear of the support structure.

According to one or more example embodiments of the present disclosure, a hole may be defined on one side of the cap member.

According to one or more example embodiments of the present disclosure, the hole may be defined in upper and lower positions with respect to the position in which the display device installed.

According to one or more example embodiments of the present disclosure, the display device may further include a sealing member disposed between an outer peripheral portion of the sound generation actuator and a rear of the support structure.

According to one or more example embodiments of the present disclosure, the sealing member may include a first sealing member in contact with the outer peripheral portion of the sound generation, actuator and having a first elastic modulus, and a second sealing member abutting the first sealing part and disposed on the rear of the support structure, the second sealing member having a second elastic modulus lower than the first elastic modulus.

According to one or more example embodiments of the present disclosure, the cap member may include a round portion with a curved surface.

According to one or more example embodiments of the present disclosure, the display device may further include a sound-absorbing layer on the inner surface of the cap member.

According to one or more example embodiments of the present disclosure, the sound generation actuator may include a lower plate, a magnet disposed on the lower plate, a center pole disposed on the central region of the lower plate, a bobbin disposed to surround the center pole, and a coil wound around the bobbin.

According to one or more example embodiments of the present disclosure, the sound generation actuator may include an extended part extending from the lower plate, and a sealing member between the extended part and the rear of the support structure.

According to one or more example embodiments of the present disclosure, the extended part may be integrally extended from the lower plate.

According to one or more example embodiments of the present disclosure, the display device may further include a molded cover surrounding a side of the lower plate of the sound generation actuator, and a sealing member between a part of the inner surface of the molded cover and the rear surface of the support structure.

According to one or more example embodiments of the present disclosure, the display device may further include a self-clinching nut secured to the support structure, the sound generation actuator and the cap member may be secured to the support structure by the self-clinching nut and a fixing bolt.

According to one or more example embodiments of the present disclosure, the display device may further include a second sound generation actuator and a second cap member, the cap member and the second cap member respectively may surround the sound generation actuator and the second sound generation actuator.

According to one or more example embodiments of the present disclosure, the second cap member may be secured to the support structure at a second area of the support structure, the second area being near the second sound generation actuator.

According to one or more example embodiments of the present disclosure, a display device includes a display panel, a cover bottom configured to cover and support at least a rear of the display panel, the cover bottom having a support hole defined therethrough, a sound generation actuator positioned in the support hole with the sound generation actuator contacting the display panel such that the sound generation actuator is configured to vibrate the display panel to generate sound, and a cap member secured to and surrounding an outer peripheral portion of the sound generation actuator.

According to one or more example embodiments of the present disclosure, the cap member may be secured to the cover bottom at an area of the cover bottom, the area being near the support hole.

According to one or more example embodiments of the present disclosure, the sound generation actuator may include a lower plate, a magnet disposed on the lower plate, a center pole disposed on the central region of the lower plate, a bobbin disposed to surround the center pole, and a coil wound around the bobbin.

Configurations in accordance with embodiments of the present disclosure may provide a number of attributes. For example, a display device may generate sound by directly vibrating a display panel constituting the display device. Further, a display device may have a sound generation actuator that is fixedly inserted into a support hole formed through a support structure of the display device in the configuration of the display device including a panel vibration type sound generation device, thereby exhibiting excellent sound generation efficiency and reducing the thickness of the display device. Moreover, a display device may include a sound generation actuator fixedly inserted into a support hole formed through a support structure of the display device and a cap member secured to surround an outer peripheral part of the sound generation actuator, thereby preventing sound leakage through the support hole. A display device may include a sound generation actuator fixedly inserted into a support hole formed through a support structure of the display device, a cap member secured to surround an outer peripheral part of the sound generation actuator, and a heat dissipation member made of a heat conductive material being disposed between the inner surface of the cap member and the actuator, thereby releasing heat generated by the sound generation actuator to the outside to prevent damage to the display panel caused by heat. Additionally, a display device may include a sound generation actuator fixedly inserted into a support hole formed through a support structure of the display device and a sealing member for preventing a reflected sound that is disposed between the inner surface of an outer peripheral part of the sound generation actuator and the outer surface of the support structure of the display device, thereby preventing sound leakage through the support hole to enhance the sound output characteristic. Also, a display device may include a sound generation actuator fixedly inserted into a support hole formed through a support structure of the display device, a cap member secured to surround an outer peripheral part of the sound generation actuator such that a through-hole for releasing heat is formed on a side of the cap member, and a sealing member for preventing a reflected sound is disposed between the inside of the outer peripheral part of the sound generation actuator and the outer surface of the support structure of the display device, thereby enhancing the efficiency to release heat generated by the sound generation actuator and preventing sound leakage through the support hole.

It will be apparent to those skilled in the art that various modifications and variations can be made in display device for generating sound by vibrating a panel of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising: a display panel configured to emit light; a support structure at a rear of the display panel; a sound generation actuator supported by the support structure and configured to vibrate the display panel to generate sound; and a cap member surrounding the sound generation actuator and secured to the support structure at an area of the support structure, the area being near the sound generation actuator and wherein the sound generation actuator includes a lower plate, a magnet disposed on the lower plate, a center pole disposed on the central region of the lower plate, a bobbin disposed to surround the center pole, and a coil wound around the bobbin.

2. The display device of claim 1, wherein the sound generation actuator is positioned through the support structure such that an end of the sound generation actuator contacts the display panel.

3. The display device of claim 1, further comprising a heat dissipation member in contact with an inner surface of the cap member and a rear of the sound generation actuator.

4. The display device of claim 3, further comprising a damping member between an edge of the cap member and a rear of the support structure.

5. The display device of claim 1, wherein a hole is defined on one side of the cap member.

6. The display device of claim 5, wherein the hole is defined in upper and lower positions with respect to the position in which the display device is installed.

7. The display device of claim 1, wherein the cap member includes a round portion with a curved surface.

8. The display device of claim 1, further comprising a sound-absorbing layer on the inner surface of the cap member.

9. The display device of claim 1, further comprising a self-clinching nut secured to the support structure, wherein the sound generation actuator and the cap member are secured to the support structure by the self-clinching nut and a fixing bolt.

10. The display device of claim 1, further comprising a second sound generation actuator and a second cap member, wherein the cap member and the second cap member respectively surround the sound generation actuator and the second sound generation actuator.

11. The display device of claim 10, wherein the second cap member is secured to the support structure at a second area of the support structure, the second area being near the second sound generation actuator.

12. A display device for generating a sound by vibrating a panel, comprising: a display panel configured to emit light; a cover bottom configured to cover and support at least a rear of the display panel, the cover bottom having a support hole defined therethrough; a sound generation actuator positioned in the support hole with the sound generation actuator contacting the display panel such that the sound generation actuator is configured to vibrate the display panel to generate sound; and a cap member secured to and surrounding an outer peripheral portion of the sound generation actuator and wherein the sound generation actuator includes a lower plate, a magnet disposed on the lower plate, a center pole disposed on the central region of the lower plate, a bobbin disposed to surround the center pole, and a coil wound around the bobbin.

13. The display device of claim 12, wherein the cap member is secured to the cover bottom at an area of the cover bottom, the area being near the support hole.

14. A display device, comprising: a display panel configured to emit light; a support structure at a rear of the display panel; a baffle part between the support structure and the display panel; a sound generation actuator supported by the support structure and configured to vibrate the display panel to generate sound; and a cap member at a rear of the sound generation actuator and wherein the sound generation actuator includes a lower plate, a magnet on the lower plate, a center pole on the central region of the lower plate, a bobbin surrounding the center pole, and a coil wound around the bobbin.

15. The display device of claim 14, wherein the cap member is secured to the support structure at an area near the sound generation actuator.

16. The display device of claim 14, wherein the support structure includes a support hole to accommodate the sound generating actuator.

17. The display device of claim 14, wherein the support structure comprises:
   a cover bottom supporting and covering a rear side of the display panel; and
   a middle cabinet supporting an edge of the display panel.

* * * * *